US010660109B2

(12) United States Patent
Bitra et al.

(10) Patent No.: US 10,660,109 B2
(45) Date of Patent: May 19, 2020

(54) SYSTEMS AND METHODS TO SUPPORT MULTIPLE CONFIGURATIONS FOR POSITIONING REFERENCE SIGNALS IN A WIRELESS NETWORK

(71) Applicant: QUALCOMM Incorporated, San Diego, CA (US)

(72) Inventors: Suresh Kumar Bitra, Mangalagiri (IN); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/709,452

(22) Filed: Sep. 19, 2017

(65) Prior Publication Data

US 2018/0139763 A1   May 17, 2018

(30) Foreign Application Priority Data

Nov. 16, 2016   (IN) .............................. 201641039027

(51) Int. Cl.
*H04W 72/08* (2009.01)
*H04L 27/26* (2006.01)
*H04L 5/00* (2006.01)

(52) U.S. Cl.
CPC ......... *H04W 72/085* (2013.01); *H04L 5/0032* (2013.01); *H04L 5/0048* (2013.01); *H04L 5/0064* (2013.01); *H04L 5/0091* (2013.01); *H04L 27/2613* (2013.01); *H04L 27/2662* (2013.01); *H04L 27/2666* (2013.01);

(Continued)

(58) Field of Classification Search
CPC . H04W 72/085; H04L 5/0048; H04L 27/2666
See application file for complete search history.

(56) References Cited

U.S. PATENT DOCUMENTS

2010/0195566 A1* 8/2010 Krishnamurthy ..... H04L 5/0007
370/328
2010/0260154 A1* 10/2010 Frank .................... G01S 5/0205
370/336

(Continued)

FOREIGN PATENT DOCUMENTS

WO        2012112101  A1     8/2012

OTHER PUBLICATIONS

International Search Report and Written Opinion—PCT/US2017/061707—ISA/EPO—dated Feb. 5, 2018.

*Primary Examiner* — Jael M Ulysse
(74) *Attorney, Agent, or Firm* — Thien T. Nguyen

(57) ABSTRACT

Disclosed are techniques for supporting multiple configurations of reference signals for OTDOA positioning in a wireless network. In an aspect, a UE sends to a location server, a message indicating reference signal characteristics supported by the UE, where the reference signal characteristics include a UE supported reference signal bandwidth. The UE then receives from the location server, positioning assistance data including reference signal configuration parameters for each cell of a plurality of cells transmitting reference signals according to the UE supported reference signal bandwidth. The UE may then perform positioning measurements for one or more of the plurality of cells transmitting the reference signals based on the reference signal configuration parameters for each cell of the plurality of cells.

29 Claims, 11 Drawing Sheets

(52) U.S. Cl.
CPC .......... *H04L 5/0012* (2013.01); *H04L 5/0023* (2013.01); *H04W 72/087* (2013.01)

(56) References Cited

U.S. PATENT DOCUMENTS

| | | | | |
|---|---|---|---|---|
| 2010/0271965 A1* | 10/2010 | Siomina | ................ | H04L 5/0048 370/252 |
| 2011/0117925 A1 | 5/2011 | Sampath et al. | | |
| 2011/0260863 A1* | 10/2011 | Hooli | .................... | G01S 5/0009 340/539.32 |
| 2011/0306335 A1* | 12/2011 | Yang | .................... | H04L 5/0064 455/422.1 |
| 2012/0051445 A1* | 3/2012 | Frank | .................... | H04L 5/0048 375/259 |
| 2012/0083288 A1* | 4/2012 | Siomina | ................ | H04W 64/00 455/456.1 |
| 2012/0276916 A1* | 11/2012 | Kazmi | .................. | G01S 5/0205 455/452.1 |
| 2012/0289247 A1* | 11/2012 | Siomina | ............. | H04W 64/003 455/456.1 |
| 2012/0307670 A1* | 12/2012 | Kazmi | .................. | H04W 24/10 370/252 |
| 2013/0083749 A1* | 4/2013 | Xu | ........................ | H04L 1/1861 370/329 |
| 2013/0260793 A1* | 10/2013 | Lim | .......................... | G01S 5/10 455/456.1 |
| 2013/0265944 A1* | 10/2013 | Frenne | .................. | H04L 1/0031 370/329 |
| 2014/0073356 A1* | 3/2014 | Siomina | ................ | G01S 5/0205 455/456.2 |
| 2014/0080506 A1* | 3/2014 | Siomina | ................ | H04W 64/00 455/456.1 |
| 2014/0198766 A1* | 7/2014 | Siomina | ............. | H04W 72/082 370/330 |
| 2014/0233493 A1* | 8/2014 | Siomina | ................ | H04L 5/0048 370/329 |
| 2015/0208271 A1* | 7/2015 | Love | ........................ | G01S 1/30 370/252 |
| 2015/0223085 A1* | 8/2015 | Siomina | ........... | H04W 52/0206 370/252 |
| 2015/0296359 A1 | 10/2015 | Edge et al. | | |
| 2016/0050534 A1* | 2/2016 | Lim | ...................... | G01S 5/0236 370/252 |
| 2016/0223639 A1* | 8/2016 | Davydov | .................. | G01S 5/04 |

* cited by examiner

SYSTEMS AND METHODS TO SUPPORT MULTIPLE CONFIGURATIONS FOR POSITIONING REFERENCE SIGNALS IN A WIRELESS NETWORK

CROSS-REFERENCE TO RELATED APPLICATIONS

The present Application for Patent claims the benefit of Indian Application No. 201641039027, entitled "SYSTEMS AND METHODS TO SUPPORT MULTIPLE CONFIGURATIONS FOR A POSITIONING REFERENCE SIGNAL IN A WIRELESS NETWORK," filed Nov. 16, 2016, assigned to the assignee hereof, and expressly incorporated herein by reference in its entirety.

BACKGROUND

1. Field of the Disclosure

Aspects of the disclosure relate to multiple configurations for Positioning Reference Signals (PRS) in a wireless network and the support of these by a location server and a mobile device to assist positioning of the mobile device.

2. Description of the Related Art

Support for enhanced Machine Type Communications (eMTC) and NarrowBand Internet of Things (NB-IOT) is being standardized by the 3$^{rd}$ Generation Partnership Project (3GPP) and is being deployed by network operators. An eMTC user equipment (UE) (also referred to as an eMTC mobile device) utilizes narrowband operation for the transmission and reception of physical channels and signals, in which the maximum carrier bandwidth is reduced to 1.4 MHz with a usable bandwidth of 1.08 MHz, or six (6) Long-Term Evolution (LTE) resource blocks (RBs). This deployment of narrowband is also referred to as LTE Category (Cat) M1. NB-IOT is another narrowband deployment that uses only 200 KHz carrier bandwidth and 180 KHz usable bandwidth (one (1) LTE RB). Because of the limitations of eMTC/NB-IOT UEs, such as narrowband processing, single receiver (Rx) antennas, poorer coverage conditions, and the like, the utilization of legacy LTE wideband Positioning Reference Signals (PRS) for positioning of UEs may not be optimal for eMTC/NB-IOT UEs, as accurate positioning needs either a wide bandwidth PRS or a large number of narrow bandwidth PRS subframe repetitions, which may result in network overhead and/or additional complexity in UEs. Improvement in PRS support for eMTC and NB-IoT UEs may therefore be desirable.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for supporting multiple configurations of reference signals for Observed Time Difference of Arrival (OTDOA) positioning includes sending, by a user equipment to a location server, a message indicating reference signal characteristics supported by the user equipment, wherein the reference signal characteristics include a user equipment supported reference signal bandwidth, receiving, at the user equipment from the location server, positioning assistance data including reference signal configuration parameters for each cell of a plurality of cells transmitting reference signals according to the user equipment supported reference signal bandwidth, and performing, by the user equipment, positioning measurements for one or more of the plurality of cells transmitting the reference signals based on the reference signal configuration parameters for each cell of the plurality of cells.

In an aspect, a method for supporting multiple configurations of reference signals for OTDOA positioning includes receiving, by a location server from a user equipment, a message indicating reference signal characteristics supported by the user equipment, wherein the reference signal characteristics include a user equipment supported reference signal bandwidth, determining, by the location server, a plurality of cells transmitting reference signals according to the reference signal bandwidth, and sending, from the location server to the user equipment, positioning assistance data including reference signal configuration parameters for each cell of the plurality of cells, wherein the reference signal configuration parameters for each cell of the plurality of cells enable positioning measurements by the user equipment for one or more of the plurality of cells transmitting the reference signals.

In an aspect, an apparatus for supporting multiple configurations of reference signals for OTDOA positioning includes a transmitter of a user equipment configured to send, to a location server, a message indicating reference signal characteristics supported by the user equipment, wherein the reference signal characteristics include a user equipment supported reference signal bandwidth, a receiver of the user equipment configured to receive, from the location server, positioning assistance data including reference signal configuration parameters for each cell of a plurality of cells transmitting reference signals according to the user equipment supported reference signal bandwidth, and at least one processor of the user equipment configured to perform positioning measurements for one or more of the plurality of cells transmitting the reference signals based on the reference signal configuration parameters for each cell of the plurality of cells.

In an aspect, an apparatus for supporting multiple configurations of reference signals for OTDOA positioning includes a receiver of a location server configured to receive, from a user equipment, a message indicating reference signal characteristics supported by the user equipment, wherein the reference signal characteristics include a user equipment supported reference signal bandwidth, at least one processor of the location server configured to determine a plurality of cells transmitting reference signals according to the reference signal bandwidth, and a transmitter of the location server configured to send, to the user equipment, positioning assistance data including reference signal configuration parameters for each cell of the plurality of cells, wherein the reference signal configuration parameters for each cell of the plurality of cells enable positioning measurements by the user equipment for one or more of the plurality of cells transmitting the reference signals.

In an aspect, an apparatus for supporting multiple configurations of reference signals for OTDOA positioning includes a means for sending of a user equipment configured to send, to a location server, a message indicating reference signal characteristics supported by the user equipment, wherein the reference signal characteristics include a user equipment supported reference signal bandwidth, a means for receiving of the user equipment configured to receive, from the location server, positioning assistance data including reference signal configuration parameters for each cell of a plurality of cells transmitting reference signals according to the user equipment supported reference signal bandwidth, and a means for processing of the user equipment configured to perform positioning measurements for one or more of the plurality of cells transmitting the reference signals based on the reference signal configuration parameters for each cell of the plurality of cells.

In an aspect, an apparatus for supporting multiple configurations of reference signals for OTDOA positioning includes a means for receiving of a location server configured to receive, from a user equipment, a message indicating reference signal characteristics supported by the user equipment, wherein the reference signal characteristics include a user equipment supported reference signal bandwidth, a means for processing of the location server configured to determine a plurality of cells transmitting reference signals according to the reference signal bandwidth, and a means for sending of the location server configured to send, to the user equipment, positioning assistance data including reference signal configuration parameters for each cell of the plurality of cells, wherein the reference signal configuration parameters for each cell of the plurality of cells enable positioning measurements by the user equipment for one or more of the plurality of cells transmitting the reference signals.

In an aspect, a non-transitory computer-readable medium storing computer-executable instructions for supporting multiple configurations of reference signals for OTDOA positioning includes computer-executable instructions comprising: at least one instruction instructing a user equipment to send, to a location server, a message indicating reference signal characteristics supported by the user equipment, wherein the reference signal characteristics include a user equipment supported reference signal bandwidth, at least one instruction instructing the user equipment to receive, from the location server, positioning assistance data including reference signal configuration parameters for each cell of a plurality of cells transmitting reference signals according to the user equipment supported reference signal bandwidth, and at least one instruction instructing the user equipment to perform positioning measurements for one or more of the plurality of cells transmitting the reference signals based on the reference signal configuration parameters for each cell of the plurality of cells.

In an aspect, a non-transitory computer-readable medium storing computer-executable instructions for supporting multiple configurations of reference signals for OTDOA positioning includes computer-executable instructions comprising: at least one instruction instructing a location server to receive, from a user equipment, a message indicating reference signal characteristics supported by the user equipment, wherein the reference signal characteristics include a user equipment supported reference signal bandwidth, at least one instruction instructing the location server to determine a plurality of cells transmitting reference signals according to the reference signal bandwidth, and at least one instruction instructing the location server to send, to the user equipment, positioning assistance data including reference signal configuration parameters for each cell of the plurality of cells, wherein the reference signal configuration parameters for each cell of the plurality of cells enable positioning measurements by the user equipment for one or more of the plurality of cells transmitting the reference signals.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
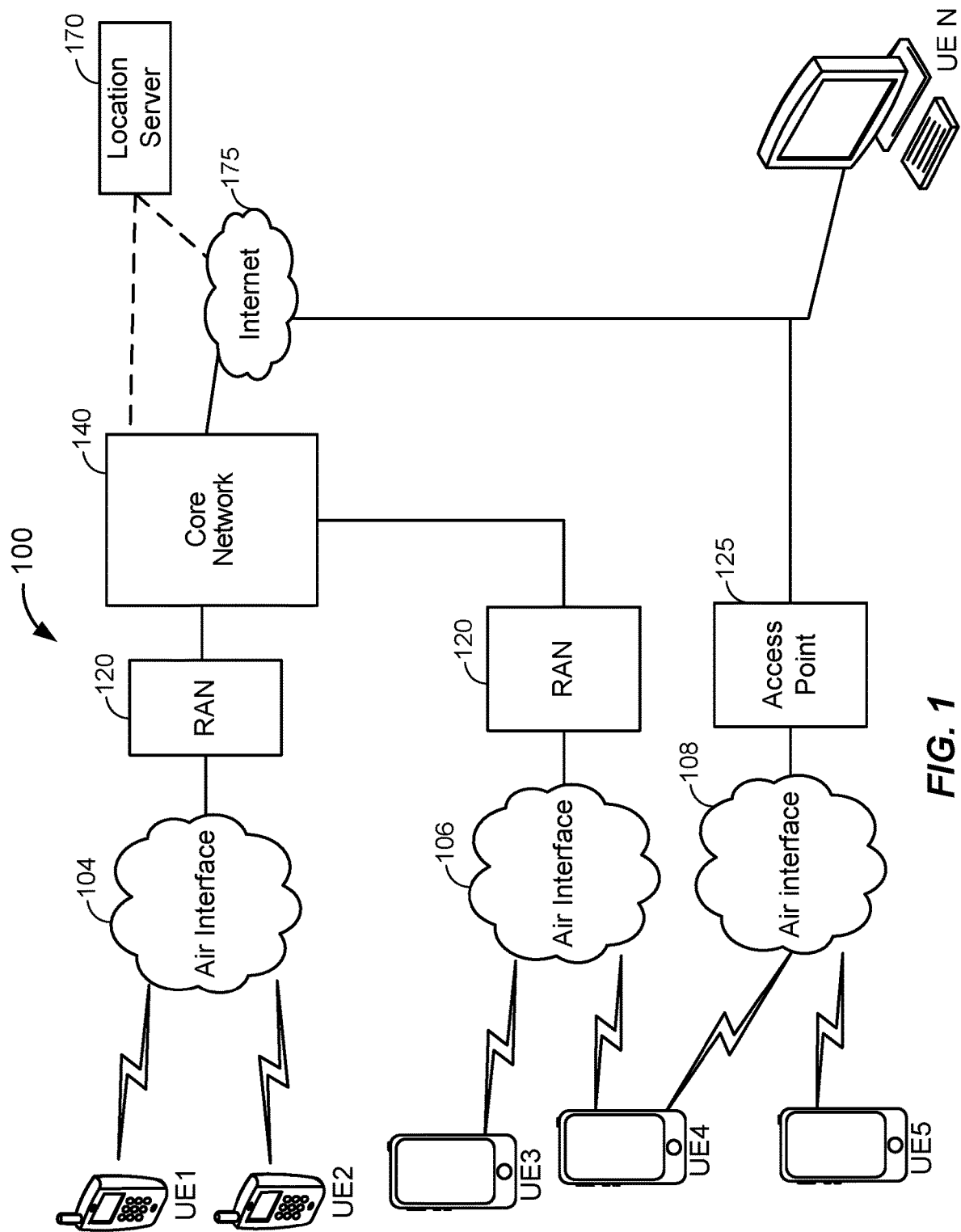
FIG. 1 illustrates a high-level system architecture of a wireless communications system in accordance with an aspect of the disclosure.

Elements in different figures with like numbers may correspond to one another. Elements in figures with a like number and different suffixes may be different instances of the same type of element. Elements in figures with a like number and different suffixes are collectively referenced in the description using just the like number. For example, in FIG. 3A, PRS positioning occasions 302-1 and 302-2 are different instances of a PRS positioning occasion for 10 MHz PRS bandwidth. PRS positioning occasions 302 therefore include PRS position occasions 302-1 and 302-2.

DETAILED DESCRIPTION

Disclosed are techniques for supporting multiple configurations for Positioning Reference Signals (PRS) in a wireless network by a location server and a mobile device (also referred to as a user equipment (UE)). In an aspect: a UE sends, to a location server, a message indicating PRS capability parameters of the user equipment, wherein the PRS capability parameters may indicate a maximum channel bandwidth within which the user equipment can detect PRS signals; receives, from the location server, positioning assistance data including PRS configuration information for a plurality of cells transmitting PRS signals within the maximum channel bandwidth; and performs positioning measurements for one or more of the plurality of cells transmitting PRS signals within the maximum channel bandwidth based on the PRS configuration information for the plurality of cells.

In another aspect, a UE sends to a location server the UE's capability to support different PRS configurations. A PRS configuration may be characterized by a number of parameters referred to herein as "PRS configuration parameters." PRS configuration parameters for LTE access can include (but are not limited to) one or more of: PRS bandwidth (e.g., number of PRS resource blocks per LTE subframe), number of consecutive PRS subframes in one PRS positioning occasion, starting system frame number and starting subframe number of the first subframe in the first PRS positioning occasion, periodicity of PRS positioning occasions, frequency hopping sequence between consecutive subframes in a PRS positioning occasion, frequency hopping sequence between consecutive PRS positioning occasions, muting of selective PRS subframes within a PRS positioning occasion, and muting of all PRS subframes in selected PRS positioning occasions.

The UE capability to support different PRS configurations may be characterized by a number of parameters referred to as "PRS capability parameters" herein. PRS capability parameters may include (but are not limited to) one or more of: a maximum PRS bandwidth supported, individual (e.g., specific) PRS bandwidth values supported; a PRS carrier frequency (or one or more PRS carrier frequencies); a number of subframes per PRS positioning occasion (or a number of alternative subframes per PRS positioning occasion); a periodicity of PRS positioning occasions (or a number of alternative periodicities of PRS positioning occasions); a type of PRS (or one or more alternative types of PRS); a portion of each supported PRS bandwidth that the UE can measure; an ability to support frequency hopping between consecutive PRS subframes in a PRS positioning occasion; an ability to support frequency hopping between consecutive PRS positioning occasions; an ability to support muting of selective PRS subframes within a PRS positioning occasion; an ability to support muting of all PRS subframes in selected PRS positioning occasions; and an ability to measure consecutive PRS subframes (e.g., using coherent integration) that belong to different PRS configurations.

A UE may provide its capability to support different PRS configurations to a location server (e.g., an Enhanced Serving Mobile Location Center (E-SMLC) or a Secure User Plane Location (SUPL) Location Platform (SLP)) by sending its PRS capability parameters to the location server. The location server may then send information to the UE for PRS configurations supported in a wireless network for certain cells nearby to the UE, where the PRS configurations are indicated as being supported by the UE according to the PRS capability parameters of the UE. The PRS configurations may be provided to the UE according to two alternative solutions. In a first solution, referred to herein as solution S1, the location server provides a separate PRS configuration to the UE for each PRS bandwidth that is partially or fully supported by the UE and comprising the PRS configuration parameters that fully describe the PRS configuration. The UE is then responsible for deciding which PRS configurations and which portions of each PRS configuration the UE will measure. In a second solution, referred to herein as solution S2, the location server uses the PRS capability parameters provided by the UE to determine which PRS configurations the UE can fully support and which PRS configurations the UE can partially support. The location server then constructs one or more PRS configurations, comprising all or part of these supported or partially supported PRS configurations that the UE will be able to fully support and returns corresponding PRS configuration parameters to the UE.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a UE, may be mobile or stationary, and may communicate with a radio access network (RAN) by wireless means. As used herein, the term "UE" may be referred to interchangeably as an "access terminal" or "AT," a "wireless device," a "wireless terminal," a "subscriber device," a "subscriber terminal," a "subscriber station," a "user terminal" or UT, a "mobile terminal," a "mobile station," a "mobile device," and variations thereof. Generally, UEs can communicate with a core network via the RAN, and through the core network the UEs can be connected with external networks such as the Internet and with external clients via these external networks. Of course, other mechanisms of connecting to the core network and/or the Internet are also possible for the UEs, such as over wired access networks, WiFi networks (e.g., based on the Institute of Electrical and Electronics Engineers (IEEE) 802.11 specification, etc.) and so on. UEs can be embodied by any of a number of types of devices including but not limited to printed circuit (PC) cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a communications system 100 in accordance with an aspect of the disclosure. The communications system 100 contains UEs 1 . . . N. The UEs 1 . . . N can include cellular telephones, smartphones, tablets, personal digital assistant (PDAs), pagers, a laptop computer, a desktop computer, navigation devices, Internet of Things (IoT) devices, and so on. For example, in FIG. 1, UEs 1, 2 are illustrated as cellular calling phones, UEs 3, 4, 5 are illustrated as cellular touchscreen phones or smartphones, and UE N is illustrated as a desktop computer or personal computer.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Enhanced High Rate Packet Data (eHRPD), Global System for Mobile communications (GSM), Enhanced Data rates for GSM Evolution (EDGE), Wideband CDMA (WCDMA), LTE, etc.), while the air interface 108 can comply with a short range wireless protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNodeBs (eNBs), New Radio (NR) NodeBs (gNBs), and so on. These access points can be terrestrial access points (or ground stations), or satellite access points. The RAN 120 is configured to connect to a core network 140 that can perform a variety of functions, including connecting circuit switched (CS) and/or packet switched (PS) calls or sessions between UEs served by the RAN 120 and other UEs served by the RAN 120 or a different RAN altogether, and can also mediate an exchange of voice, data and/or other media between UEs served by the RAN 120 and other UEs and external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to connect packet-switched voice and data communications between UE N and UEs 1 . . . N via the core network 140. Also shown in FIG. 1 is the access point 125 that is separate from the RAN 120. The access point 125 may be connected to the Internet 175 independently of the core network 140 (e.g., via an optical communication system such as FiOS, a cable modem, etc.). The air interface 108 may serve UE 4 or UE 5 over a local wireless connection, such as IEEE 802.11 in an example.

Referring to FIG. 1, a location server 170 is shown as connected to the Internet 175, the core network 140, or both. The location server 170 can be implemented as a plurality of structurally separate servers, or alternately may correspond to a single server. As will be described below in more detail, the location server 170 is configured to support one or more location services for UEs that can connect to the location server 170 via the core network 140 and/or the Internet 175.

Figure 2A:
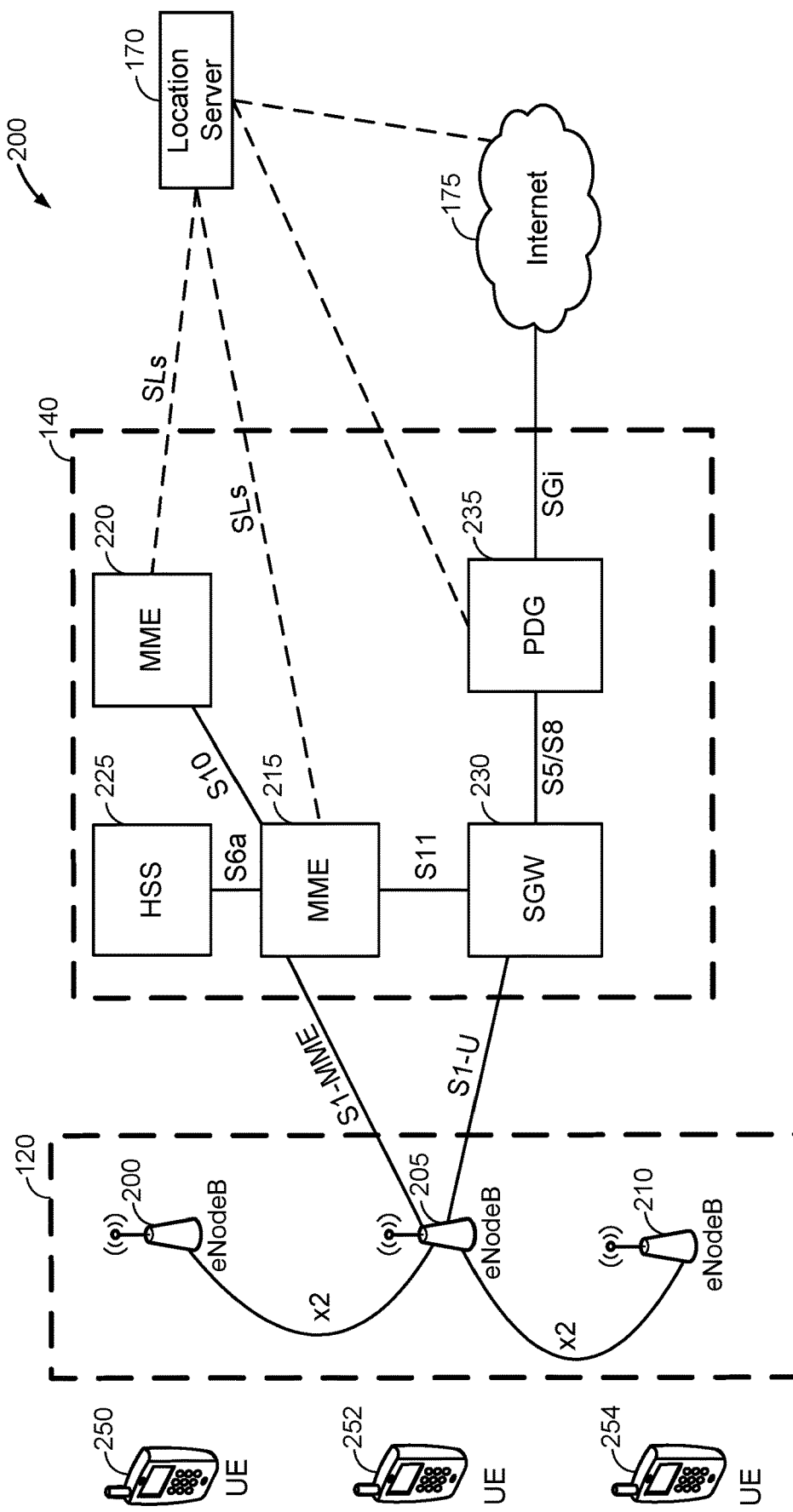
FIG. 2A illustrates an example configuration of a Radio Access Network (RAN) and a portion of a core network that is based on an Evolved Packet System (EPS) or Long-Term Evolution (LTE) network in accordance with an aspect of the disclosure.

FIG. 2A illustrates an example configuration of the RAN 120 and a portion of the core network 140 of the communications system 100 based on an Evolved Packet System (EPS) or LTE network, in accordance with an aspect of the disclosure. Referring to FIG. 2A, the RAN 120 in the EPS/LTE network is configured with a plurality of Evolved NodeBs (eNodeBs or eNBs) 200, 205, and 210, which support LTE wireless access on air interface 104 and/or 106. In FIG. 2A, the core network 140 includes a plurality of Mobility Management Entities (MMEs) 215 and 220, a Home Subscriber Server (HSS) 225, a Serving Gateway (SGW) 230 and a Packet Data Network Gateway (PDG) 235. Network interfaces between these components, the RAN 120, the location server 170 and the Internet 175 are illustrated in FIG. 2A and are defined in Table 2 (below) as follows:

TABLE 1

EPS/LTE Core Network Connection Definitions

| Network Interface | Description |
| --- | --- |
| S1-MME | Reference point for the control plane protocol between RAN 120 and MME 215. |
| S1-U | Reference point between RAN 120 and SGW 230 for the per bearer user plane tunneling and inter-eNodeB path switching during handover. |
| S5 | Provides user plane tunneling and tunnel management between SGW 230 and PDG 235. It is used for SGW relocation due to UE mobility and if the SGW 230 needs to connect to a non-collocated PDG for the required Packet Data Network (PDN) connectivity. |
| S6a | Enables transfer of subscription and authentication data for authenticating/authorizing user access to the evolved system (Authentication, Authorization, and Accounting (AAA) interface) between MME 215 and HSS 225. |
| S8 | Inter-PLMN reference point providing user and control plane between the SGW 230 in a Visited Public Land Mobile Network (VPLMN) and the PDG 235 in a Home Public Land Mobile Network (HPLMN). S8 is the inter-PLMN variant of S5. |
| S10 | Reference point between MMEs 215 and 220 for MME relocation and MME to MME information transfer. |
| S11 | Reference point between MME 215 and SGW 230. |
| SGi | Reference point between the PDG 235 and a packet data network, shown in FIG. 2A as the Internet 175. The packet data network may be an operator external public or private packet data network or an intra-operator packet data network (e.g., for provision of Internet Protocol (IP) Multimedia Subsystem (IMS) services). |
| SLs | Interface between an MME and the location server 170 in the event that location server 170 is or contains an Enhanced Serving Mobile Location Center (E-SMLC) |
| X2 | Reference point between two different eNodeBs used for UE handoffs. |

A high-level description of the components shown in FIG. 2A will now be provided. However, these components are each well-known in the art from various 3GPP Technical Specifications (TSs), such as TS 23.401, and the description contained herein is not intended to be an exhaustive description of all functionalities performed by these components.

Referring to FIG. 2A, the eNBs 200, 205, and 210 are configured to provide LTE, Enhanced Machine Type Communications (eMTC), and/or NarrowBand Internet of Things (NB-IOT) radio access to UEs (e.g., any of UEs 250, 252, and 254) and to provide signaling and voice/data connectivity between any UE and elements in core network 140, such as MME 215 and SGW 230. The eNBs 200, 205, and 210 may also be configured to broadcast a PRS signal to nearby UEs to enable any UE to make measurements of PRS timing differences between pairs of eNBs and thereby enable a location estimate of the UE to be obtained by the UE itself or by a location server (e.g., location server 170) to which the timing difference measurements may be sent using Observed Time Difference of Arrival (OTDOA) positioning.

The term "location estimate" is used herein to refer to an estimate of a location for a UE (e.g., any of UEs 250, 252, and 254), which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A location estimate may also be referred to as a "location," a "position," a "fix," a "position fix," a "location fix," a "position estimate," a "fix estimate," or by some other term. The means of obtaining a location estimate may be referred to generically as "positioning," "locating," or "position fixing." A particular solution for obtaining a location estimate may be referred to as a "location solution." A particular method for obtaining a location estimate as part of a location solution may be referred to as a "position method" or as a "positioning method."

Referring to FIG. 2A, the MMEs 215, and 220 are configured to support network attachment of UEs (e.g., UEs 250, 252, and 254), mobility of UEs, and bearer assignment to UEs. MME functions include: Non-Access Stratum (NAS) signaling to UEs, NAS signaling security, mobility management for inter- and intra-technology handovers of UEs, PDG and SGW selection, and MME selection for UE handovers with MME change.

Referring to FIG. 2A, the SGW 230 is the gateway that terminates the user plane interface toward the RAN 120. For each UE attached to the core network 140 for an EPS-based system, at a given point of time, there may be a single SGW. The functions of the SGW 230 include: mobility anchor point, packet routing and forwarding, and transport level packet marking in the uplink and the downlink (e.g., setting the DiffServ Code Point (DSCP) based on a Quality of Service (QoS) Class Identifier (QCI) of an associated EPS bearer).

Referring to FIG. 2A, the PDG 235 is the gateway that terminates the SGi user plane interface toward the PDN, e.g., the Internet 175. If a UE is accessing multiple PDNs, there may be more than one PDG for that UE. PDG 235 functions include: packet filtering (e.g., using deep packet inspection), UE IP address allocation, transport level packet marking in the uplink and downlink (e.g., setting the DSCP based on the QCI of an associated EPS bearer), accounting for inter operator charging, uplink (UL) and downlink (DL) bearer binding, UL and DL rate enforcement and service level rate enforcement, and UL bearer binding. The PDG 235 may provide PDN connectivity to both GSM/EDGE Radio Access Network (GERAN)/Universal Terrestrial Radio Access Network (UTRAN)-only UEs, and Enhanced UTRAN (E-UTRAN)-capable UEs using any of E-UTRAN, GERAN, or UTRAN. The PDG 235 may provide PDN connectivity to E-UTRAN-capable UEs using E-UTRAN only over the S5/S8 interface.

In FIG. 2A, the location server 170 is shown as connected to one or more of the Internet 175, the PDG 235, MME 220, and MME 215. The connections to MME 215 and MME 220 are applicable when location server 170 is or contains an E-SMLC. The connections to the Internet 175 and/or to the PDG 235 are applicable when location server 170 is or contains an SLP, such a Home SLP (H-SLP), Emergency SLP (E-SLP), or Discovered SLP (D-SLP). Location server 170 may be used (i) to obtain a location for any of UEs 250, 252, and 254 (e.g., from signal measurements obtained and transferred by any of UEs 250, 252, and 254) and/or (ii) to provide assistance data to any of UEs 250, 252, and 254 to enable any of UEs 250, 252, and 254 to acquire and measure signals (e.g., signals from one or more of eNBs 200, 205, and 210) and, in some cases, compute a location from these signal measurements. Examples of assistance data can be orbital and timing data for Global Positioning System (GPS) or other Global Navigation Satellite System (GNSS) satellites when GPS or GNSS positioning is used, or information concerning downlink transmission from eNBs nearby to a UE (e.g., any of eNBs 200, 205, and 210) when OTDOA is used for positioning.

It should be noted that core network 140, RAN 120, and location server 170 in FIG. 2A may correspond, respectively, to core network 140, RAN 120, and location server 170 in FIG. 1. In addition, UEs 250, 252, and 254 in FIG. 2A may each correspond to any of UEs 1 to N in FIG. 1.

Figure 2B:
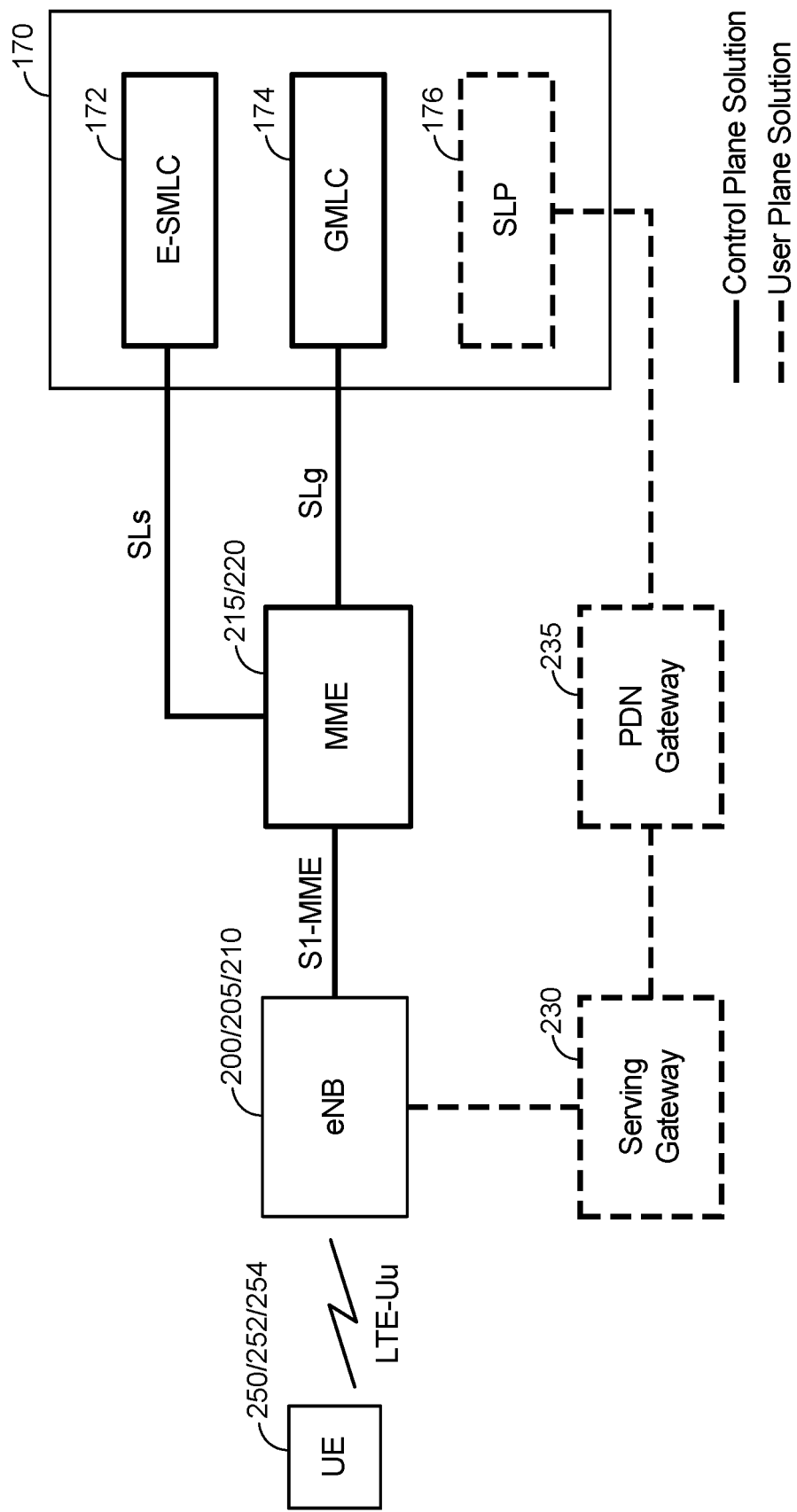
FIG. 2B is a high-level diagram showing additional features of the communication system discussed with reference to FIG. 2A.

FIG. 2B is a high-level diagram showing additional features of the communications system 100 discussed above with reference to FIG. 2A. For example, as illustrated in FIG. 2B, the location server 170 may include an E-SMLC 172, a Gateway Mobile Location Center (GMLC) 174, and an SLP 176. FIG. 2B also illustrates the type of communications between various components. For example, communications between the eNB 200/205/210, the SGW 230, the PDG 235, and the SLP 176 may support a user plane location solution, while communications between the eNB 200/205/210, the MME 215/220, and the E-SMLC 172 and/or the GMLC 174 may support a control plane location solution.

As discussed above, to locate a UE (e.g., UE 250, 252, and/or 254) geographically, there are several approaches. This disclosure utilizes the Observed Time Difference Of Arrival (OTDOA) positioning method which is defined by the 3rd Generation Partnership Project (3GPP) (e.g., in 3GPP Technical Specification (TS) 36.355) for wireless networks that provide wireless access using LTE. OTDOA is a multilateration method in which the UE measures the time difference, known as a Reference Signal Time Difference (RSTD), between specific signals (e.g., PRS signals) from different pairs of eNodeBs and either reports these time differences to a location server, such as the E-SMLC 172 or SLP 176, or computes a location itself from these time differences.

Generally, RSTDs are measured between a reference cell and one or more neighbor cells. The reference cell remains the same for all RSTDs measured by a UE for any single positioning use of OTDOA and would typically correspond to the serving cell for the UE or another nearby cell with good signal strength at the UE. The neighbor cells would normally be supported by eNBs different from the eNB for the reference cell and may have good or poor signal strength at the UE. The location computation can be based on the measured time differences (e.g., RSTDs) and knowledge of the eNBs' locations and relative transmission timing (e.g., regarding whether eNBs are accurately synchronized or whether each eNB transmits with some known time difference relative to other eNBs).

When a UE obtains a location estimate itself using OTDOA measured time differences, the necessary additional data (e.g., eNBs' locations and relative transmission timing) may be provided to the UE by a location server (e.g., E-SMLC 172 or SLP 176). In some implementations, a location estimate for a UE may be obtained (e.g., by the UE itself or by a location server) from OTDOA measured time differences and from other measurements made by the UE (e.g., measurements of signal timing from GPS or other GNSS satellites). In these implementations, known as hybrid positioning, the OTDOA measurements may contribute towards obtaining a UE location estimate but may not wholly determine the location estimate.

Figure 3A:
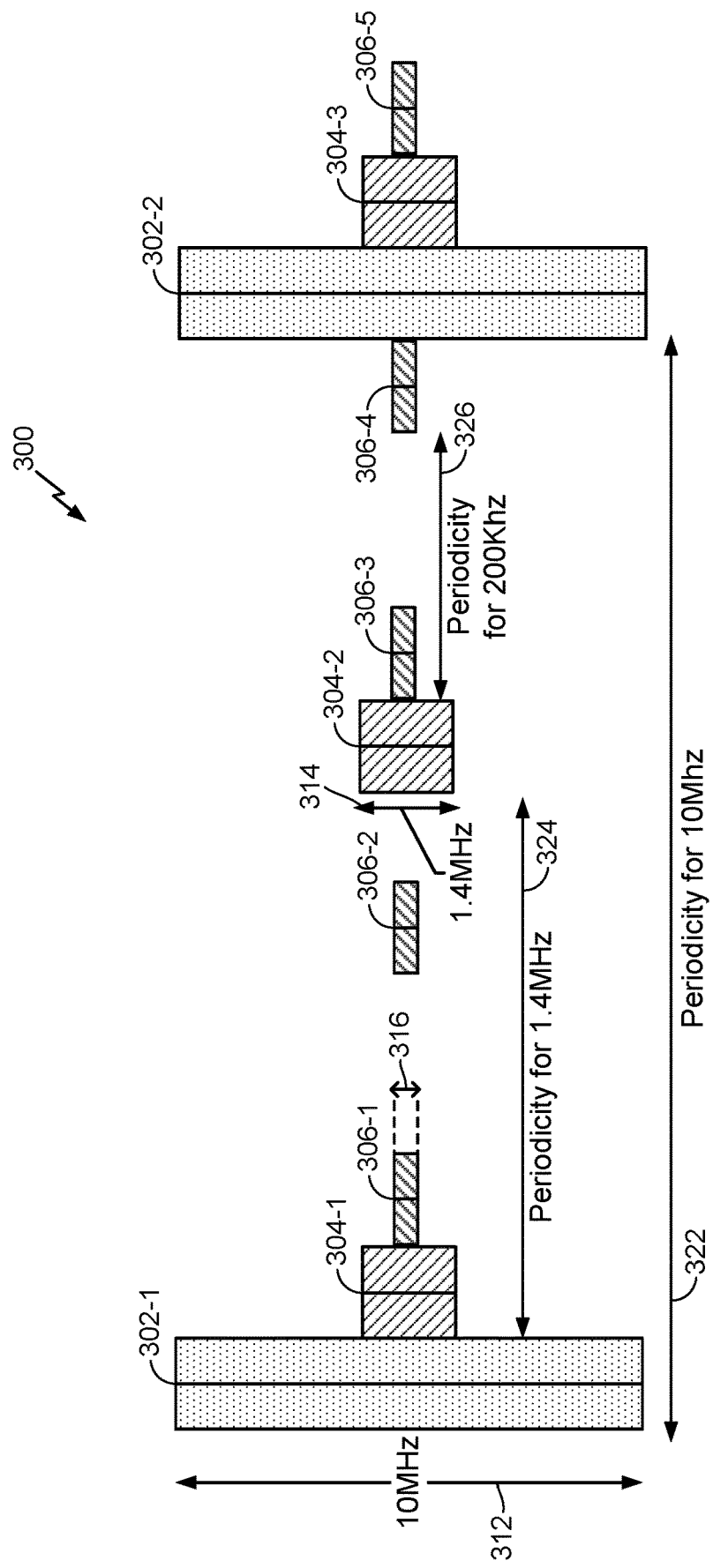
FIGS. 3A and 3B illustrate example Positioning Reference Signal (PRS) configurations for support of Observed Time Difference of Arrival (OTDOA).

FIG. 3A illustrates example PRS configurations 300 for support of OTDOA within a single cell or within a plurality of associated cells. PRS configurations 300 in FIG. 3A may be based, at least in part, on PRS transmission for LTE as defined in 3GPP TS 36.211. A single cell may comprise a single wide bandwidth cell supporting at least 1.4 MHz carrier bandwidth or a single narrow bandwidth cell supporting 200 KHz carrier bandwidth. A plurality of associated cells may comprise zero or one wide bandwidth cell supporting at least 1.4 MHz carrier bandwidth and one or more narrow bandwidth cells each supporting 200 KHz carrier bandwidth, where all the associated cells in the plurality use the same carrier frequency, are supported by the same eNB and have approximately the same coverage areas (e.g., share a common coverage area) and where each narrow bandwidth cell may have an additional frequency offset. A plurality of two or more associated cells as just described is referred to herein as a "cell set." In terms of supporting OTDOA, this means that a single reference cell or a single neighbor cell may be replaced by two or more associated cells and is then referred to herein as a "reference cell set" or "neighbor cell set," in each case respectively. It is noted that in case of supporting the PRS configurations shown in FIG. 3A and described below, a single reference cell or a single neighbor cell would need to support at least 10 MHz carrier bandwidth, whereas a reference cell set or neighbor cell set would need to include one wide bandwidth cell supporting at least 10 MHz carrier bandwidth.

PRS configurations 300 in FIG. 3A comprise a number of PRS positioning occasions for three different PRS carrier bandwidth values—10 MHz, 1.4 MHz, and 200 KHz. Each PRS positioning occasion in the example of FIG. 3A comprises two consecutive LTE subframes and occurs at different fixed periodic intervals. The series of LTE subframes (referred to herein as PRS subframes) containing PRS signals that are transmitted for the cell or cell set are represented horizontally in FIG. 3A, with later subframes shown to the right of earlier subframes. The PRS bandwidth for each PRS subframe is represented vertically in FIG. 3A with higher PRS bandwidth occupying greater vertical extent. For simplicity, FIG. 3A only shows a few PRS positioning occasions transmitted by the cell or cell set over any complete sequence of 1024 LTE system frames. Additional PRS positioning occasions not shown in FIG. 3A may be present that could be represented to the left and/or right of FIG. 3A if additional space were available.

PRS configurations 300 includes a series of PRS positioning occasions 302 that include PRS positioning occasions 302-1 and 302-2 that have 10 MHz PRS carrier bandwidth 312, two PRS subframes per positioning occasion, and fixed periodicity 322. PRS configurations 300 also include a series of PRS positioning occasions 304 that include PRS positioning occasions 304-1, 304-2, and 304-3 that have 1.4 MHz PRS carrier bandwidth 314, two PRS subframes per positioning occasion, and fixed periodicity 324. PRS configurations 300 further include a series of PRS positioning occasions 306 that include PRS positioning occasions 306-1, 306-2, 306-3, 306-4, and 306-5 that have 200 KHz PRS carrier bandwidth 316, two PRS subframes per positioning occasion, and fixed periodicity 326. In this example, the duration of the 10 MHz periodicity 322 is double that for the 1.4 MHz periodicity 324 and four times that for the 200 KHz periodicity 326.

The PRS positioning occasions 302, 304, and 306 correspond to three distinct PRS configurations which, for convenience, are referred to by the same reference numbers in the description below for FIG. 3A. Thus, for example, PRS configuration 302 comprises PRS positioning occasions 302 and includes PRS positioning occasions 302-1 and 302-2. It is noted that for PRS configurations 300, 10 MHz PRS carrier bandwidth 312 may correspond to 9 MHz of usable (occupied) PRS bandwidth, 1.4 MHz PRS carrier bandwidth 314 may correspond to 1.08 MHz of usable (occupied) PRS bandwidth and 200 KHz PRS carrier bandwidth 316 may correspond to 180 KHz of usable (occupied) PRS bandwidth. A UE and location server may then refer to the PRS bandwidth using either the PRS carrier bandwidth or the PRS usable bandwidth.

In the example in FIG. 3A, PRS configuration parameters for each of the PRS configurations 302, 304, and 306 include the PRS bandwidth (312, 314, and 316 respectively), the periodicity of consecutive PRS positioning occasions (322, 324, and 326 respectively) and the number of consecutive PRS subframes in each PRS positioning occasion (which is two in each case in this example). Other PRS configuration parameters not explicitly shown in FIG. 3A could include one or more of the radio frame offset and subframe offset of the first PRS positioning occasion for each PRS configuration 302, 304, and 306 in any sequence of 1024 LTE system frames, a PRS code sequence, a PRS frequency shift, a PRS muting pattern, and a PRS direction of transmission (e.g., when a PRS is beamformed by an eNB or gNB in a particular direction using a multiple antenna array).

A UE, such as UE 250, 252, or 254, may support all PRS configurations 300 or only some. To indicate which PRS configurations are supported, a UE may provide PRS capability parameters to a location server (e.g., location server 170) as described earlier. Different examples (labelled A to I) of PRS capability parameters are shown in Table 2 that a UE may indicate to a location server. For each PRS capability parameter that a UE may indicate, Table 2 shows the corresponding assistance data comprising PRS configuration parameters that the location server could return to the UE for OTDOA positioning of the UE for a reference cell (or reference cell set) or a neighbor cell (or neighbor cell set) that support the example PRS configurations 300. In Table 2, the PRS configuration parameters returned by the location server are referred to by the PRS configurations they describe and may comprise any of the PRS configuration parameters described previously for each PRS configuration in FIG. 3A. It is noted that PRS bandwidth in Table 2 refers to the carrier bandwidth (e.g., 200 KHz, 1.4 MHz or 10 MHz) but could instead refer to the usable PRS bandwidth (e.g., 180 KHz, 1.08 MHz or 9 MHz) or the number of LTE resource blocks included in the PRS (e.g., one, six, or fifty resource blocks in this example).

TABLE 2

Example PRS Capability Parameters and PRS Configuration Parameters

| Example | PRS Capability Parameters Sent by the UE to the Location Server | PRS Configuration Parameters returned by the Location Server to the UE |
|---|---|---|
| A | Maximum PRS Bandwidth = 200 KHz | PRS Configuration 306 |
| B | Maximum PRS Bandwidth = 1.4 MHz | PRS Configurations 304, 306 |
| C | Maximum PRS Bandwidth = 10 MHz | PRS Configurations 302, 304, 306 |
| D | Supported PRS Bandwidth = 200 KHz | PRS Configuration 306 |

TABLE 2-continued

Example PRS Capability Parameters
and PRS Configuration Parameters

| Example | PRS Capability Parameters Sent by the UE to the Location Server | PRS Configuration Parameters returned by the Location Server to the UE |
|---|---|---|
| E | Supported PRS Bandwidth = 1.4 MHz | PRS Configuration 304 |
| F | Supported PRS Bandwidth = 10 MHz | PRS Configuration 302 |
| G | Supported PRS Bandwidth = 200 KHz and 1.4 MHz | PRS Configurations 306, 304 |
| H | Supported PRS Bandwidth = 1.4 MHz and 10 MHz | PRS Configurations 304, 302 |
| I | Supported PRS Bandwidth = 200 KHz, 1.4 MHz and 10 MHz | PRS Configurations 306, 304, 302 |

In example A in Table 2, the UE indicates its capability to support a maximum PRS bandwidth of 200 KHz by providing a corresponding PRS capability parameter to the location server. The location server may then select a reference cell (or reference cell set) and one or more neighbor cells (and/or neighbor cell sets) for OTDOA positioning of the UE that each support at least a PRS configuration with a PRS bandwidth of 200 KHz. A cell (or cell set) supporting PRS configuration 306 would be an example of such a reference cell (or reference cell set) or neighbor cell (or neighbor cell set). For such a cell (or cell set) supporting the example PRS configuration 306, the location server can provide assistance data to the UE comprising PRS configuration parameters (e.g., as described above) for PRS configuration 306, which has a PRS bandwidth of 200 KHz and which is supported by the UE.

In examples B and C in Table 2, the UE indicates support for a maximum PRS bandwidth of 1.4 MHz and 10 MHz, respectively. In these examples, the location server may select a reference and neighbor cells (or reference and/or neighbor cell sets) that support any PRS bandwidth value(s) up to this maximum value. In case a cell (or cell set) supporting the example PRS configurations 300 is selected, the location server can return assistance data to the UE comprising PRS configuration parameters for PRS configurations 304 and 306 for example B and PRS configurations 302, 304, and 306 for example C.

In examples D to I in Table 2, the UE provides PRS capability parameters indicating the specific PRS bandwidth values that are supported by the UE rather than a maximum PRS bandwidth value. A specific PRS bandwidth value supported by a UE corresponds to a single PRS bandwidth value (e.g., 200 KHz, 1.4 MHz or 10 MHz in this example) and means that the UE supports at least this bandwidth value—and may or may not support other bandwidth values. In these examples, the location server may select a reference cell and neighbor cells (and/or reference and/or neighbor cell sets) that support at least a PRS configuration with a PRS bandwidth supported by the UE. In case a reference cell or neighbor cell (or a reference or neighbor cell set) is selected that supports the example PRS configurations 300, Table 2 shows in the right hand column the particular PRS configurations belonging to PRS configurations 300 for which the location server could provide PRS configuration parameters as OTDOA assistance data to the UE.

In the examples shown in Table 2, a UE is assumed to completely support PRS configurations conforming to the PRS capability parameters provided by the UE to the location server, as shown in the left hand column of Table 2, and not to support PRS configurations that do not conform to these PRS configuration parameters. For instance, for example E in Table 2, the UE is assumed to completely support and therefore be able to measure PRS configurations that use a PRS carrier bandwidth of 1.4 MHz (such as PRS configuration 304 of PRS configurations 300) and to not support and to not be able to measure PRS configurations with other PRS bandwidth values, such as PRS configurations 302 and 306 in PRS configurations 300. However, a UE may sometimes be able to partly, but not fully, support some PRS configurations. For example, a UE that can fully support PRS configurations with 1.4 MHz bandwidth may be able to support (e.g., acquire and measure) a subset comprising six contiguous resource blocks for a PRS configuration with 10 MHz PRS bandwidth. Similarly, a UE that can fully support PRS configurations with 200 KHz PRS bandwidth may be able to support a subset comprising one resource block (with 200 KHz bandwidth) for a PRS configuration with either 10 MHz PRS bandwidth or 1.4 MHz PRS bandwidth.

In the solution S1 referred to previously, a UE with this partial support for a particular PRS configuration may indicate full support for the PRS configuration to a location server, and after receiving PRS configuration parameters from the location server for any cell (or cell set) supporting this PRS configuration, may proceed to acquire and measure only the portion (e.g., subset) of the PRS configuration supported by the UE. While this may simplify provision of PRS configuration parameters to a UE by a location server, solution S1 may cause a location server to select a reference cell and/or neighbor cells (or reference and/or neighbor cell sets) that support less suitable PRS configurations than some other cells (or cell sets). For example, a UE that fully supports 200 KHz PRS bandwidth and partially supports 1.4 MHz and 10 MHz PRS bandwidth may indicate to a location server full support of each of 200 KHz, 1.4 MHz, and 10 MHz PRS bandwidths. The location server may then select a reference cell and neighbor cells that only support PRS configurations with 1.4 MHz and/or 10 MHz PRS bandwidth but do not support PRS configurations (or do not have associated cells that supports PRS configurations) with 200 KHz PRS bandwidth. Although the UE may then be able to acquire and measure a single resource block with 200 KHz PRS bandwidth for each positioning occasion having 1.4 MHz or 10 MHz PRS bandwidth, if the number of consecutive PRS subframes for these PRS positioning occasions is small (e.g., only one subframe) and/or if the duration of periodicity of PRS positioning occasions is high, the accuracy of the RSTD measurements may be poor compared to measurement of a PRS configuration with 200 KHz PRS bandwidth that uses more consecutive PRS subframes for each PRS positioning occasion and/or has a lower duration of periodicity of PRS positioning occasions.

To overcome this disadvantage, in solution S2 referred to previously, a UE may indicate to a location server its precise capability to support different PRS configurations. For example, a UE that fully supports 200 KHz PRS bandwidth may include PRS capability parameters indicating full support for 200 KHz PRS bandwidth and partial support for 1.4 MHz and 10 MHz PRS bandwidth, where the partial support corresponds to support of (and an ability to measure) one resource block (200 KHz) for PRS positioning occasions with 1.4 MHz and 10 MHz PRS bandwidth. A location server may then use this additional information to better select a suitable reference cell (or reference cell set) and neighbor cells (and/or neighbor cell sets) for OTDOA. As an example, a location server may select cells (and/or cell sets)

with the greatest number of PRS positioning occasions and/or greatest number of consecutive PRS subframes per positioning occasion regardless of the associated PRS bandwidth values.

Figure 3B:
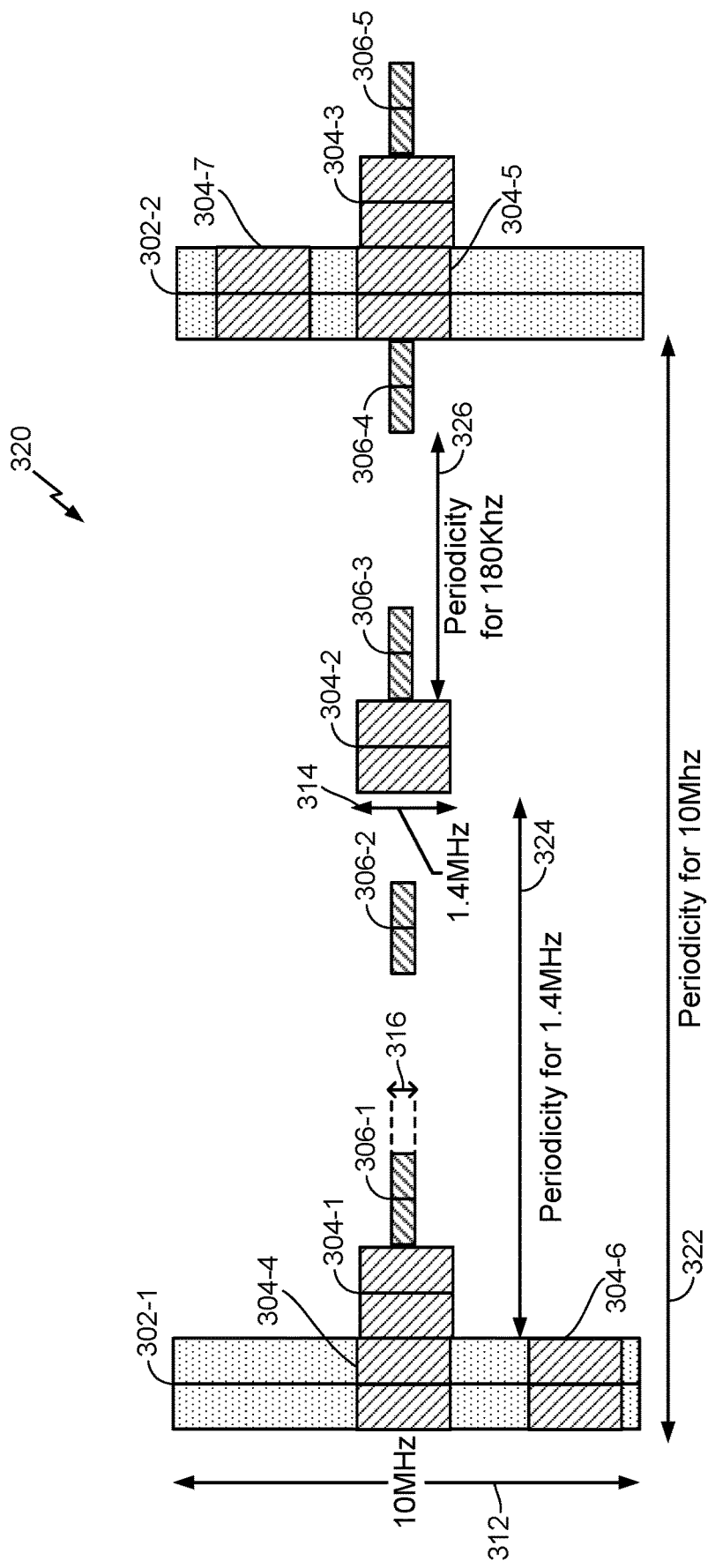

FIG. 3B provides one example 320 showing PRS configuration parameters that a location server may return to a UE as assistance data according to solution S2 described above when a cell (or a cell set) selected by the location server supports the PRS configurations 300 in FIG. 3A. FIG. 3B assumes that a UE indicates full support for PRS configurations with 1.4 MHz bandwidth and partial support for PRS configurations with 10 MHz PRS bandwidth, where the partial support corresponds to an ability to measure six resource blocks (with 1.08 MHz usable PRS bandwidth) within PRS positioning occasions with 10 MHz bandwidth. In addition, the UE indicates to the location server that the six resource blocks must either be centered in the carrier frequency (case 1) or can be frequency hopped to other parts of the carrier frequency (case 2). For case 1 and case 2, the location server may return PRS configuration parameters to the UE indicating PRS positioning occasions 304-1, 304-2, 304-3, 304-4, and 304-5 in FIG. 3B, which each comprise 1.4 MHz PRS bandwidth centered in the carrier frequency. Here, PRS positioning occasions 304-4 and 304-5 comprise the center six resource blocks for PRS positioning occasions 302-1 and 302-2. For case 2 but not for case 1, a location server could instead return PRS configuration parameters to the UE indicating PRS positioning occasions 304-1, 304-2, and 304-3 as well as 304-6 and 304-7 (or 304-4 and 304-7, or 304-6 and 304-5). Here, PRS positioning occasions 304-6 and 304-7 comprise six non-centered consecutive resource blocks for PRS positioning occasions 302-1 and 302-2.

To indicate PRS positioning occasions 304 in FIG. 3B to a UE, a location server may indicate PRS positioning occasions 304-1, 304-2 and 304-3 as part of a first PRS configuration that has a periodicity 324, PRS carrier bandwidth of 1.4 MHz and with two subframes per PRS positioning occasion as described previously for FIG. 3A. This first PRS configuration corresponds to PRS configuration 304 as described for FIG. 3A. The location server may further indicate one of PRS positioning occasions 304-4 or 304-6 and one of PRS positioning occasions 304-5 or 304-7 to the UE as part of a second PRS configuration, different to the first PRS configuration, that has a periodicity equal to the periodicity 324, a PRS carrier bandwidth of 1.4 MHz and with two subframes per PRS positioning occasion. The descriptions of both the first and second PRS configurations may be as defined in 3GPP TSs 36.355 and 36.211 and may not require any 3GPP standards changes or implementation changes to a UE. However, the second PRS configuration as described previously and as shown in FIG. 3B may be a subset of a third PRS configuration, corresponding to the PRS configuration 302 in FIG. 3A, where the subset is obtained by using all the PRS positioning occasions 302 and all the PRS subframes for the third PRS configuration but using only a subset of the PRS bandwidth and/or a subset of PRS resource blocks for the third PRS configuration. While the location server may need to define (or create) the second PRS configuration from the subset of the third PRS configuration, the UE may not need to be aware of this (or aware of the third PRS configuration) and may treat the second PRS configuration the same as any other PRS configuration (e.g., may treat the second PRS configuration similarly to the first PRS configuration).

FIGS. 3A and 3B illustrate: (i) use of PRS capability parameters to enable a UE to indicate its PRS capabilities for OTDOA for LTE access to a location server; (ii) the ability of a location server to select an OTDOA reference cell and neighbor cells (or an OTDOA reference cell set and/or neighbor cell sets) based on the PRS capability parameters; and (iii) provision by a location server of PRS configuration parameters to a UE for supported or partially supported PRS configurations for a reference cell and neighbor cells (or a reference cell set and/or neighbor cell sets). These techniques are illustrated for three PRS bandwidths (of 200 KHz, 1.4 MHz and 10 MHz). However, the same techniques are applicable to other PRS bandwidth values such as 5 MHz and 20 MHz in addition to or instead of the PRS bandwidth values exemplified in FIGS. 3A and 3B.

In some implementations, it may be beneficial to reduce the amount of signaling (e.g., number of bits or octets) that are needed to transfer PRS capability parameters from a UE to a location server and/or to transfer PRS configuration parameters from a location server to a UE. For example, when NB-IoT is used by a UE to access an LTE network, transmission delay may be increased (e.g., in comparison to LTE operating at 5-20 MHz) due to the lower carrier bandwidth (of 200 KHz) and due to a higher likelihood of transmission errors and the need for retransmission when signal levels are low.

To reduce the extra transmission delay, signaling to transfer PRS capability parameters and PRS configuration parameters may be compressed. In the case of PRS capability parameters, a UE could indicate the PRS bandwidth values supported by the UE using a sequence of bits, flags, or Boolean values, where each bit, flag, or Boolean value in the sequence uses one value (e.g., a binary one or Boolean true) to indicate that a particular PRS bandwidth is partially or fully supported by the UE and another value (e.g., a binary zero or Boolean false) to indicate that a particular PRS bandwidth is not supported by the UE. A UE may also indicate the maximum PRS bandwidth, BMax, that is supported by the UE (e.g., using a numeric value comprising a few bits). If a PRS bandwidth B1 is indicated by the UE as being supported (e.g., partially or fully supported), and if B1 is equal to or less than BMax, there may be a convention or rule that the UE support the PRS bandwidth B1 by being able to measure resource blocks with the PRS bandwidth B1 within any PRS subframes with a PRS bandwidth of at least B1 and not more than Bmax. If a PRS bandwidth B2 is indicated by the UE as being supported (e.g., partially or fully supported), and if B2 exceeds BMax, there may be a convention or rule that the UE is only required to partially support the PRS bandwidth B2 by being able to measure resource blocks with the PRS bandwidth BMax within any PRS subframes with a PRS bandwidth of B2. For example, if BMax is 1.4 MHz and if the UE indicates support for a PRS bandwidth of 10 MHz, the convention may be that the UE need only be able to measure six resource blocks (with a carrier bandwidth of 1.4 MHz) within PRS subframes with a PRS bandwidth of 10 MHz, as in the example described in association with FIG. 3B, where a UE cannot measure the entire set of resource blocks for the 10 MHz positioning occasions 302 but can measure one or more PRS positioning occasions 304-4, 304-5, 304-6, and 304-7, which each comprise six resource blocks. A UE could further indicate in its PRS capability parameters whether the UE is only able to measure PRS positioning occasions centered on the carrier frequency (such as PRS positioning occasions 304-4 and 304-5 in FIG. 3B) or is also able to measure PRS positioning occasions that are frequency hopped (such as PRS positioning occasions 304-6 and 304-7 in FIG. 3B).

In order to compress signaling for PRS configuration parameters, a location server may include PRS configuration parameters in assistance data sent to a UE only once for any type of PRS configuration. A location server may then reference the PRS configuration parameters applicable to any PRS configuration supported by a cell without repeating the PRS configuration parameters. Several types of references may be used. One type of reference may assign a label (e.g., a unique integer) to each set of PRS configuration parameters that are sent to a UE with the location server including the label for any cell that supports a PRS configuration with these PRS configuration parameters. With another type of reference, PRS configuration parameters P1 may be included for one cell C1 (e.g., a reference cell or a neighbor cell) that supports the corresponding PRS configuration. For any other cell C2 that supports the same PRS configuration, there may be a reference to cell C1 together, optionally, with one PRS configuration parameter (e.g., PRS bandwidth) from within P1 that may be used to identify P1 when configuration parameters for other PRS configurations are also included for cell C1.

Figure 4:
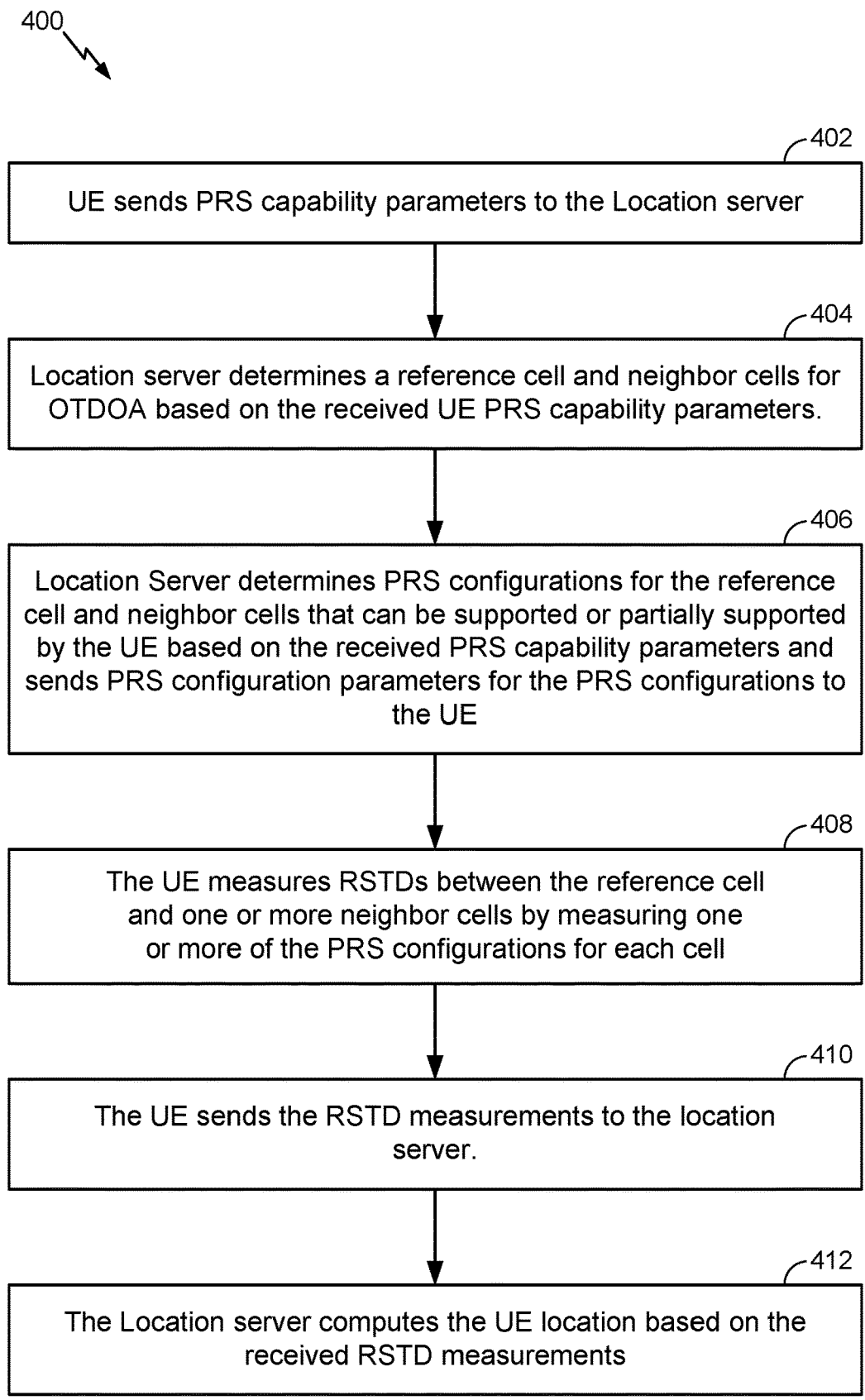
FIG. 4 illustrates an exemplary process flow according to at least one aspect of the disclosure.

FIG. 4 illustrates an exemplary process flow 400 according to at least one aspect of the disclosure. Referring to FIG. 4, at block 402, a UE (e.g., UE 250/252/254) sends its PRS capability parameters to a location server (e.g., location server 170, E-SMLC 172, SLP 176). In an aspect, the UE can send the PRS capability parameters to the location server using an LTE Positioning Protocol (LPP) Provide Capabilities message.

At block 404, the location server determines a reference cell and neighbor cells (or a reference cell set and/or neighbor cell sets) for positioning of the UE using OTDOA based on the PRS capability parameters received at block 402. For example, the location server may select as a reference cell the current serving cell (or a plurality of associated cells for the serving cell) for the UE or another nearby cell (e.g., adjacent to the serving cell) (or a plurality of associated cells for the nearby cell) that supports PRS configurations that can be measured by the UE as indicated by the PRS capability parameters received at block 402. The location server may further select a reference cell (or a reference cell set) with the greatest number of PRS configurations that can be measured by the UE, the greatest number of PRS subframes within PRS configurations that can be measured by the UE, the highest PRS bandwidth that can be measured by the UE, the greatest number of consecutive PRS subframes across all PRS configurations that can be measured by the UE, or some combination of these criteria. The location server may further select neighbor cells (and/or neighbor cell sets) according to criteria similar to or the same as those used to select the reference cell (or reference cell set).

At block 406, the location server determines the PRS configurations for the reference cell and neighbor cells (or reference cell set and/or neighbor cell sets) that can be supported or partially supported by the UE based on the received PRS capability parameters and sends PRS configuration parameters for the PRS configurations to the UE (e.g., in an LPP Provide Assistance Data message). The PRS configuration parameters may fully define each of the PRS configurations. Alternatively, for any PRS configuration that is only partly supported by the UE, the location server may derive a subset of the PRS configuration (e.g., as described in association with FIG. 3B), where the subset is fully supported by the UE. For example, a subset may comprise a subset of resource blocks in each PRS subframe, all of which can be measured by the UE. Thus for example, if the UE can measure a PRS signal comprising 1.4 MHz carrier bandwidth with six resource blocks and a PRS configuration includes PRS subframes with a bandwidth of 5 MHz or 10 MHz, the location server may derive a subset of this containing just six resource blocks. Moreover, if the UE indicates in the PRS capability parameters sent at block 402 that the UE is able to support frequency hopping of the PRS signal, the location server may determine six resource blocks using frequency hopping across different PRS subframes or across different PRS positioning occasions. Conversely, if the PRS capability parameters indicate that the UE does not support PRS frequency hopping, the location server may determine the six resource blocks centered in each PRS subframe. The location server then sends PRS configuration parameters for the determined PRS configurations (or determined subsets of the PRS configurations) to the UE (e.g., in an LPP Provide Assistance Data message).

At block 408, the UE measures RSTDs between the reference cell (or reference cell set) and one or more of the neighbor cells (and/or neighbor cell sets) provided at block 406 by measuring one or more of the PRS configurations for each cell (and/or for each cell set). The UE determines the PRS configurations to measure based on the PRS configuration parameters received at block 406.

At block 410, the UE sends the RSTD measurements to the location server (e.g., in an LPP Provide Location Information message).

At block 412, the location server uses the RSTD measurements received at block 410 to calculate the position of the UE. The calculated position may be forwarded to the UE or, for example, an external client such as a Public Safety Answering Point (PSAP) during an emergency call.

Figure 5:
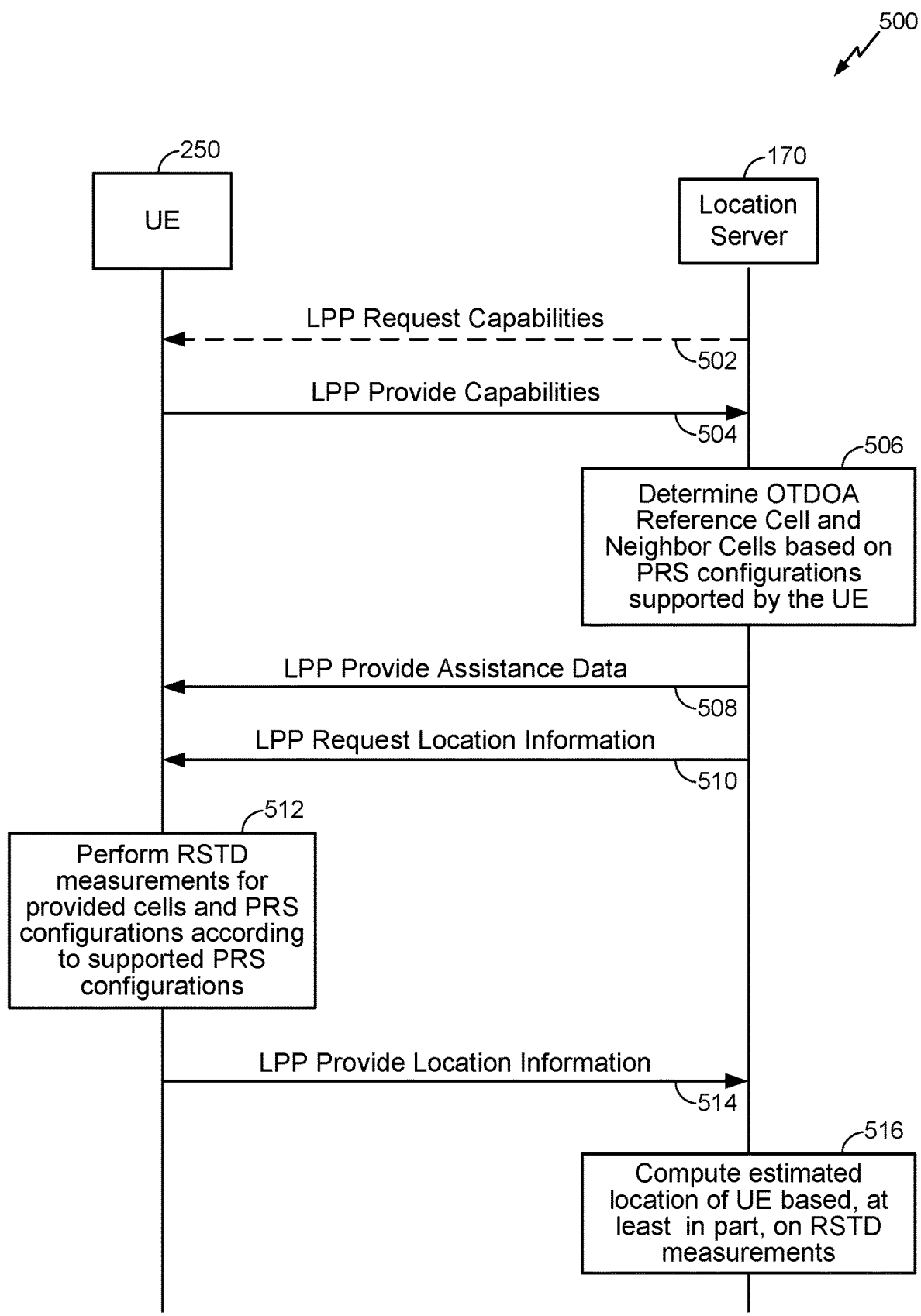
FIG. 5 shows an exemplary signaling flow illustrating how the process flow depicted in FIG. 4 can utilize OTDOA and the LTE Positioning Protocol (LPP) protocol.

FIG. 5 shows an exemplary signaling flow 500 illustrating how the process flow 400 depicted in FIG. 4 can utilize OTDOA and the LPP protocol. As illustrated in FIG. 5, positioning of the UE 250 (although UE 250 is shown, the flow 500 illustrated in FIG. 5 applies to any of UEs 250, 252, and 254) is supported via an exchange of LPP messages between the UE 250 and the location server 170 (e.g., the E-SMLC 172 or SLP 176 in FIG. 2B). The LPP messages may be exchanged between UE 250 and the location server 170 via one or more intermediate networks, such as RAN 120 (e.g., via eNB 200, 205 or 210) and core network 140 (e.g., via MME 215 with a control plane location solution when location server 170 comprises E-SMLC 172 or via PDG 235 and SGW 230 with a user plane location solution when location server 170 comprises SLP 176). The LPP messages and the procedures that they support are described in 3GPP TS 36.355. The procedure shown in FIG. 5 may be used to position the UE 250 in order to support various location-related services, such as navigation for UE 250 (or for the user of UE 250), or for routing, or for provision of an accurate location to a PSAP in association with an emergency call from UE 250 to a PSAP, or for some other reason.

Initially and as an optional operation of signaling flow 500, the UE 250 may receive a request for its positioning capabilities from the location server 170 at stage 502 (e.g., an LPP Request Capabilities message). At stage 504, the UE 250 provides its positioning capabilities to the location server 170 relative to the LPP protocol by sending an LPP Provide Capabilities message to location server 170 indicating the position methods and features of these position methods that are supported by the UE 250 using LPP. The capabilities indicated in the LPP Provide Capabilities message may, in some aspects, indicate that the UE 250 supports OTDOA positioning and may indicate the capabilities of the UE 250 to support OTDOA. The UE 250 can include PRS capability parameters describing supported PRS configurations for OTDOA in the LPP Provide Capabilities message. For example, the PRS capability parameters can describe the PRS bandwidth that the UE 250 supports, such as by including a maximum PRS bandwidth value and/or one or more individual (e.g., specific) PRS bandwidth values supported or partially supported by UE 250.

At stage 506, the location server 170 determines to use the OTDOA position method based on the indicated UE 250 support for OTDOA at stage 504 and determines a reference cell and neighbor cells (or a reference cell set and/or neighbor cell sets) for OTDOA based at least in part on the PRS capability parameters received at stage 504 (for example, as described in association with FIGS. 3A, 3B, and 4). The location server 170 may further determine one or more PRS configurations to be measured by the UE 250 for each one of the reference cell and each neighbor cell (or for each one of a reference cell set and/or neighbor cell sets) based on the PRS capability parameters received from the UE at stage 504. For example, the PRS configurations may be selected as described in association with Table 2 and FIGS. 3A and 3B and may be based on use of solution S1 or solution S2 described previously. The location server 170 then sends an LPP Provide Assistance Data message to the UE 250 at stage 508. In some implementations, the LPP Provide Assistance Data message at stage 508 may be sent by the location server 170 to the UE 250 in response to an LPP Request Assistance Data message sent by the UE 250 to the location server 170 (not shown in FIG. 5).

The LPP Provide Assistance Data message may include positioning assistance data in the form of OTDOA assistance data to enable or to help enable the UE 250 to obtain and return OTDOA RSTD measurements, and may include information for the reference cell (or reference cell set) identified at stage 506 (e.g., corresponding to one of eNBs 200, 205, 210). The information for the reference cell (or reference cell set) may include a global ID for the reference cell (or a global ID for each cell in a reference cell set), a physical cell ID for the reference cell (or a physical cell ID for each cell in reference cell set), carrier frequency information, and PRS configuration parameters for the PRS configurations determined for the reference cell (or reference cell set) at stage 506 (e.g., PRS bandwidth, PRS carrier frequency, number of subframes per PRS positioning occasion, PRS code sequence, starting point and periodicity of PRS positioning occasions, PRS direction of transmission and/or muting sequence).

The LPP Provide Assistance Data message may also include OTDOA assistance data for neighbor cells (and/or neighbor cell sets) identified at stage 506 (e.g., corresponding to one or more of eNBs 200, 205, 210). In an example, if the UE 250 indicates support for inter-frequency RSTD measurements, the neighbor cell assistance data may be provided for up to three (3) frequency layers. The information provided for each neighbor cell (and/or each neighbor cell set) in the LPP Provide Assistance Data message may be similar to that provided for the reference cell (e.g., may include a cell ID, cell frequency, and PRS configuration parameters for the PRS configurations determined at stage 506) and may further include, for example, a slot number and/or subframe offset between the neighbor cell (or neighbor cell set) and the reference cell (or reference cell set), and/or an expected approximate RSTD value and RSTD uncertainty. The PRS configuration parameters provided by the location server for the reference cell (or reference cell set) and each neighbor cell (or neighbor cell set) at stage 508 may be as described in association with FIGS. 3A and 3B.

At stage 510, the location server 170 sends a request for location information to the UE 250. The request may be an LPP Request Location Information message. Note that in some implementations, the LPP Provide Assistance Data message sent at stage 508 may be sent after the LPP Request Location Information message at 510—e.g., if UE 250 sends a request for assistance data to location server 170 (e.g., in an LPP Request Assistance Data message, not shown in FIG. 5) after receiving the request for location information at stage 510. The request for location information sent at stage 510 may request the UE 250 to obtain RSTD measurements for OTDOA—e.g., in association with the information for the reference cell (or reference cell set), neighbor cells (and/or neighbor cell sets) and PRS configuration parameters sent to UE 250 at stage 508.

At stage 512, the UE 250 utilizes the OTDOA positioning assistance information received at stage 508 and any additional data (e.g., a desired location accuracy or a maximum response time) received at stage 510 to perform RSTD measurements for the OTDOA position method. The RSTD measurements may be made between the reference cell (set) indicated at stage 508, or a reference cell (or reference cell set) determined by the UE from the neighbor cells (and/or neighbor cell sets) indicated at stage 508, and one or more of the (other) neighbor cells (and/or neighbor cell sets) indicated at stage 508. The UE 250 utilizes the PRS configuration parameters for the reference and neighbor cells (and/or cell sets) provided at stage 508 to acquire and measure PRS signals for these cells (and/or cell sets), and according to the PRS configurations supported by UE 250, in order to obtain RSTD measurements.

At stage 514, the UE 250 may send an LPP Provide Location Information message to the location server 170 conveying the RSTD measurements that were obtained at stage 512 and before or when any maximum response time has expired (e.g., a maximum response time provided by the location server 170 at stage 510). The LPP Provide Location Information message at stage 514 may include the time (or times) at which the RSTD measurements were obtained, the PRS configurations used (e.g., which type of PRS was measured, such as the PRS bandwidth or number of resource blocks that were measured) and the identity of the reference cell (or an identity of one cell in a reference cell set) for the RSTD measurements (e.g., the reference cell ID and carrier frequency). The message at stage 514 may also include a neighbor cell measurement list including, for each measured neighbor cell (and/or for each measured neighbor cell set), the identity of the cell or of one cell in a cell set (e.g., the physical cell ID, global cell ID, and/or cell carrier frequency), the RSTD measurement for the cell (or cell set), and the quality of the RSTD measurement for the cell (or cell set) (e.g., the expected error in the RSTD measurements). The neighbor cell measurement list may include RSTD data for one or more cells.

At stage 516, the location server 170 computes an estimated location of the UE 250 using OTDOA positioning techniques based, at least in part, on measurements received in the LPP Provide Location Information message at stage 514 (e.g., RSTD measurements). In an alternative aspect (not shown in FIG. 5), the location computation at stage 516 may be performed by the UE 250 after stage 512. For example, the positioning assistance data transferred in the message at stage 508 may include base station almanac (BSA) data for the reference cell(s) and neighbor cells (e.g., cell antenna location coordinates and timing or time synchronization information). In that case, the UE 250 may return any computed location estimate to the location server 170 in the message at stage 514 and stage 516 may not be performed.

FIG. 5 shows, and other figures reference, exemplary support for OTDOA positioning with LTE radio access by a UE (e.g., UE 250) and, in some cases, using the LPP positioning protocol. However, other examples exist where the support of PRS capability parameters and PRS configuration parameters by a UE and location server may be similar to or the same as that described for these figures but where the positioning protocol, the position method and/or the radio access type (RAT) may be different. For example, in alternative aspects, the positioning protocol may be LPP Extensions (LPPe) defined by OMA, a combination of LPP with LPPe (referred to as LPP/LPPe), the Resource Radio Control (RRC) protocol defined in 3GPP TS 36.331, the IS-801 protocol defined in 3GPP2 TS C.S0022, or an evolution of LPP for NR or 5G RAT access (e.g., which may be referred to as an NR Positioning Protocol or NPPa or NRPPa). Similarly, the position method may be OTDOA for Universal Mobile Telecommunications System (UMTS) access, Enhanced Observed Time Difference (E-OTD) for GSM, Advanced Forward Link Trilateration (AFLT) or OTDOA for NR or 5G radio access. Further, the RAT may be UMTS (e.g., when the position method is OTDOA for UMTS) or may be NR or 5G (e.g., when the position method is OTDOA for NR or 5G). In addition, the downlink signal that is measured by a UE (e.g., UE 250) and broadcast by a base station (e.g., any of eNBs 200, 205 and 210 in the case of PRS) may not be a PRS signal but some other downlink reference signal or pilot signal (e.g., a cell-specific reference signal (CRS) for LTE or a tracking reference signal (TRS) for NR or 5G) and the measurements of the downlink signal may not be of RSTD but instead (or in addition) of some other characteristic such as Time of Arrival (TOA), Angle of Arrival (AOA), Received Signal Strength Indicator (RSSI), Round Trip signal propagationTime (RTT), Signal-to-Noise (S/N) ratio, etc. Although the positioning protocol, the position method, the RAT, and/or the measured characteristics may differ, the provision of PRS (or other reference signal) capability parameters by the UE at stage 504 in signaling flow 500 and provision of PRS (or other reference signal) configuration parameters by the location server at stage 508 may be the same as or similar to that described previously.

For LTE downlink PRS based positioning methods, such as UE Assisted and UE Based OTDOA described previously, location accuracy may be highly dependent on time of arrival (TOA) measurements of the PRSs at the UE (e.g., UE 250), which in turn may be dependent on the PRS bandwidth. Generally, a higher PRS bandwidth may provide more accurate TOA measurements and thus more accurate location.

UEs that support eMTC and/or NB-IoT RATs may implement an LTE PRS based positioning method by adopting either of the following methods, which have their own advantages and disadvantages with respect to radio frequency (RF) complexity and power.

A first method is to use an RF front-end (RFFE) to receive only a 1.4 MHz or 200 KHz carrier and perform RF re-tuning as for frequency hopping. A second method is to use a wider bandwidth RFFE of (e.g., 5 MHz, 10 MHz, or 20 MHz) and to filter out and output the 1.4 MHz eMTC signal or 200 KHz NB-IoT signal on the digital side for baseband processing to provide eMTC or NB-IoT services, respectively. With the first method, the PRS bandwidth supported by the UE may be restricted to 1.4 MHz or 200 KHz. With the second method, a UE may be capable of measuring a wide bandwidth PRS (e.g., with 5, 10 or 20 MHz bandwidth). Since measurement of a higher PRS bandwidth may increase location accuracy, there may be a benefit in enabling UEs that support the second method to measure a higher PRS bandwidth. This may be achieved if the UE includes the maximum PRS bandwidth and/or the specific PRS bandwidth values that the UE supports in the PRS capability parameters provided to a location server (e.g., as at stage 504 in FIG. 5) and if the location server then selects a reference cell (or reference cell set) and neighbor cells (and/or neighbor cell sets) that support the highest PRS bandwidth that can be measured by the UE. The location server may then provide PRS configurations parameters to the UE (e.g., as at stage 508 in FIG. 5) that define PRS configurations to be measured by the UE which support this highest PRS bandwidth. As an example, of providing a maximum PRS bandwidth that is supported and/or a specific PRS bandwidth that is supported, a new parameter or information element may be added to an LPP Provide Capabilities message (e.g., as defined in 3GPP TS 36.355) as part of the OTDOA capabilities of a UE. Additionally, a location server may use the maximum supported PRS bandwidth of a UE to determine the likely accuracy of a calculated UE location using OTDOA.

Figure 6:
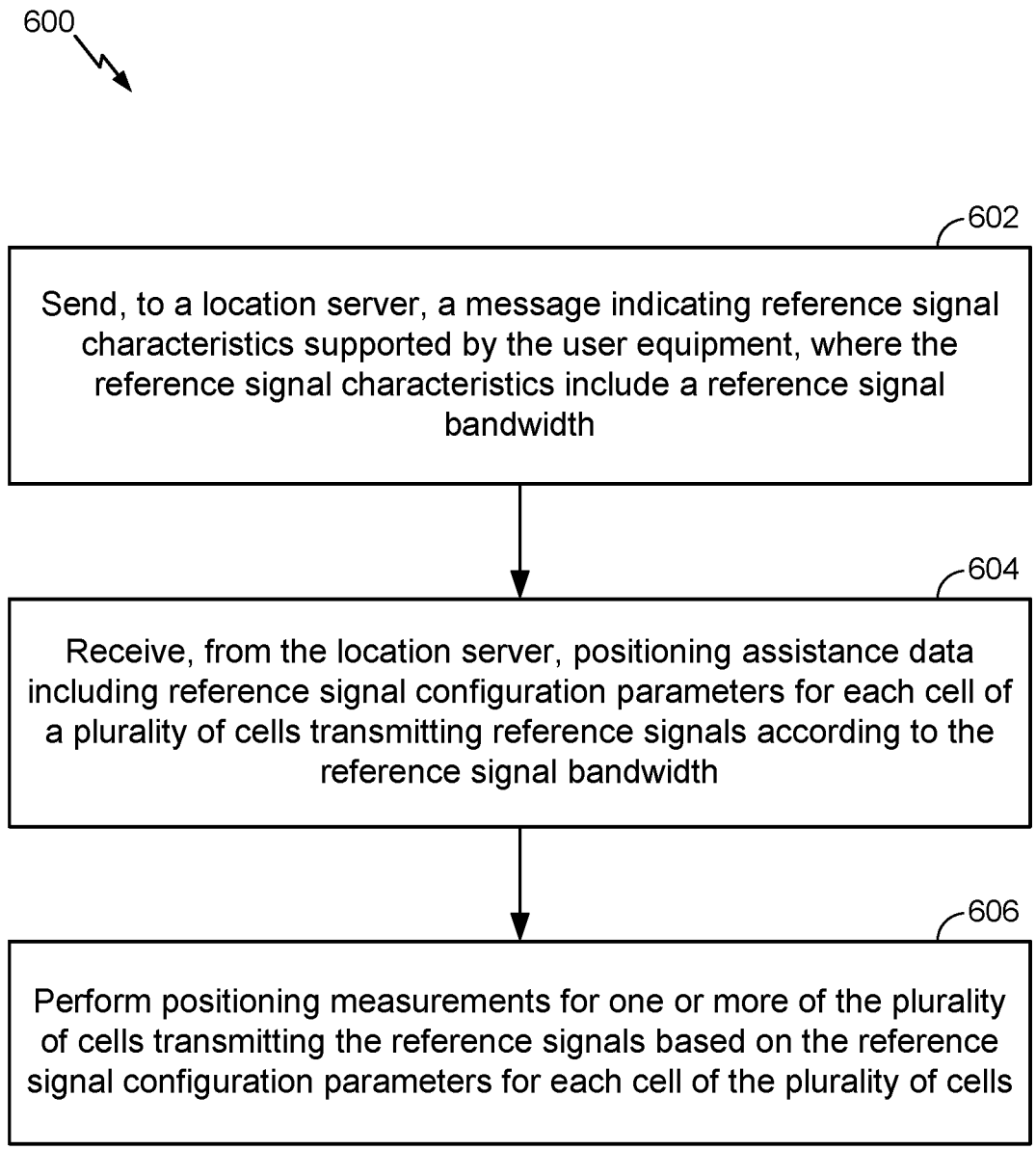
FIGS. 6 and 7 illustrate exemplary process flows according to at least one aspect of the disclosure.

FIG. 6 illustrates an exemplary process flow 600 according to at least one aspect of the disclosure for supporting multiple configurations of reference signals for OTDOA positioning at a UE. For example, the reference signals may comprise Positioning Reference Signals (PRS) or Cell-specific Reference Signals (CRS) for LTE or reference signals (e.g., PRS) for NR or 5G. The UE may correspond to any of UEs 1 to N in communications system 100 or any of UEs 250, 252 and 254 in FIGS. 2A and 2B.

The method may start at block 602 where the UE sends a message to a location server (e.g., location server 170, E-SMLC 172 or SLP 176) indicating reference signal characteristics supported by the user equipment, where the reference signal characteristics include a user equipment supported reference signal bandwidth. In one example, the message may include reference signal capability parameters of the UE, where the reference signal capability parameters indicate the reference signal characteristics supported by the UE. In an aspect, the user equipment supported reference signal bandwidth may comprise at least one reference signal bandwidth value supported by the UE (e.g., a specific reference signal bandwidth as described in association with Table 2). In this aspect, the user equipment supported reference signal bandwidth may further comprise a maximum reference signal bandwidth value supported by the UE (e.g., as described in association with Table 2). Block 602 may correspond to block 402 in process flow 400 and/or to stage 504 in signaling flow 500.

At block 604, the UE receives, from the location server, positioning assistance data including reference signal configuration parameters for each cell of a plurality of cells transmitting reference signals according to the reference signal bandwidth (e.g., as exemplified by Table 2 previously herein). In an aspect, at least one cell of the plurality of cells comprises a cell set, where the cell set comprises one wide bandwidth cell and a least one narrow bandwidth cell, and where the wide bandwidth cell and the at least one narrow bandwidth cell share the same base station, the same carrier frequency and a common coverage area. Block 604 may correspond to block 406 in process flow 400 and/or to stage 508 in signaling flow 500.

At block 606, the UE performs positioning measurements for one or more of the plurality of cells transmitting the reference signals based on the reference signal configuration parameters for each cell of the plurality of cells received at block 604. The positioning measurements may be measurements of RSTD in an aspect. Block 606 may correspond to block 408 in process flow 400 and/or to stage 512 in signaling flow 500.

In an aspect, the reference signal characteristics for block 602 comprise at least one of a carrier bandwidth, a carrier frequency, a number of subframes per reference signal positioning occasion, a periodicity of reference signal positioning occasions, a muting, a type of reference signal, a carrier frequency hopping, or some combination of these.

In an aspect, the reference signal configuration parameters received at block 604 for each cell of the plurality of cells comprise parameters for at least one reference signal configuration for each cell of the plurality of cells, where the parameters for the at least one reference signal configuration for each cell of the plurality of cells comprise at least one of a carrier bandwidth, a carrier frequency, a carrier frequency offset, a number of subframes per positioning occasion, a starting point and periodicity of positioning occasions, a muting sequence, a code sequence, a frequency hopping sequence, a direction of transmission, or some combination of these. In this aspect, the at least one reference signal configuration for at least one cell of the plurality of cells may be a subset of a second reference signal configuration for the at least one cell of the plurality of cells (e.g., as described in association with FIG. 3B previously herein), where the subset is based on a subset of reference signal bandwidth or a subset of reference signal resource blocks for the second reference signal configuration, and where the subset of reference signal bandwidth or the subset of reference signal resource blocks is based on the user equipment supported reference signal bandwidth.

In an aspect, the plurality of cells transmitting reference signals comprise cells that transmit reference signals corresponding to the reference signal characteristics. For example, the transmitted reference signals may correspond to one or more transmitted reference signal configurations that can each be supported (e.g., measured) by the user equipment based on the reference signal characteristics (e.g., as exemplified herein in association with FIGS. 3A and 3B).

In an aspect, the location server generates the positioning assistance data based on the reference signal characteristics (e.g., as described for block 406 in process flow 400 and stages 506 and 508 for signaling flow 500).

In an aspect, the location server selects at least one cell of the plurality of cells based on the at least one cell having a greatest number of reference signal configurations that can be measured by the UE, a greatest number of reference signal subframes within reference signal configurations that can be measured by the UE, a highest reference signal bandwidth that can be measured by the UE, a greatest number of consecutive reference signal subframes across all reference signal configurations that can be measured by the UE, or some combination of these.

In an aspect, the process flow 600 may comprise additional actions. For example, the UE may receive a positioning request from the location server (e.g., as at stage 510 in signaling flow 500) and may send the positioning measurements to the location server (e.g., as at stage 514 in signaling flow 500). The location server may then calculate a location of the UE based on the positioning measurements (e.g., as at stage 516 in process flow 500). In an alternative aspect, the UE may calculate a location of the UE based on the positioning measurements and may send the calculated location to the location server.

Figure 7:
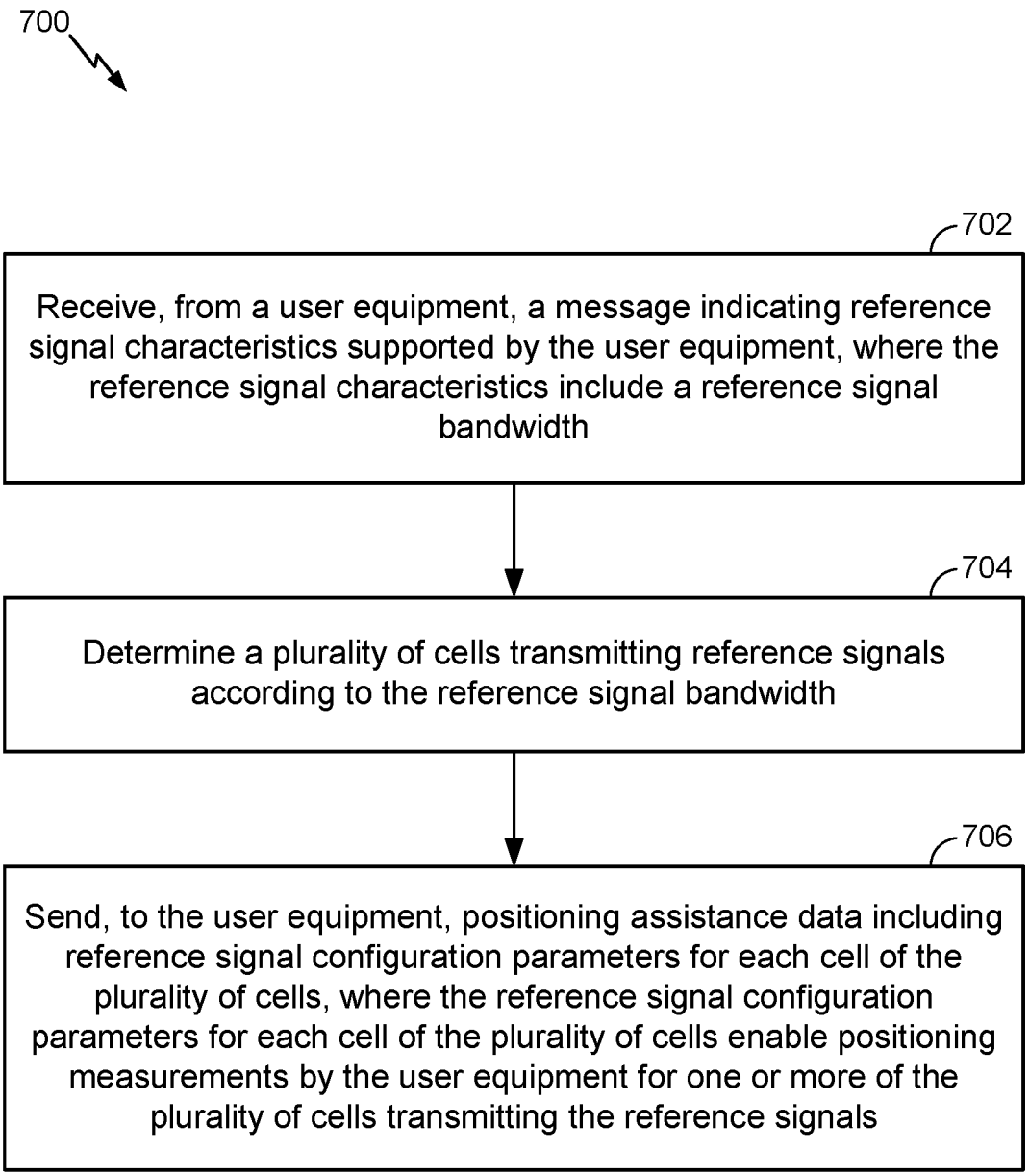

FIG. 7 illustrates an exemplary process flow 700 according to at least one aspect of the disclosure for supporting multiple configurations of reference signals for OTDOA positioning at a location server. For example, the reference signals may comprise Positioning Reference Signals (PRS) or Cell-specific Reference Signals (CRS) for LTE or reference signals (e.g., PRS) for 5G or NR. The location server may correspond to location server 170 in communications system 100 or to E-SMLC 172 or SLP 176 in FIGS. 2A and 2B.

Process flow 700 may start at block 702 where the location server may receive from a UE (e.g., any of UEs 1 to N in communications system 100 or any of UEs 250, 252 and 254 in FIGS. 2A and 2B), a message indicating reference signal characteristics supported by the UE, where the reference signal characteristics include a user equipment supported reference signal bandwidth. For example, the message may include reference signal capability parameters of the UE, where the reference signal capability parameters indicate the reference signal characteristics supported by the UE. In an aspect, the user equipment supported reference signal bandwidth may comprise at least one reference signal bandwidth value supported by the UE (e.g., a specific bandwidth value as described in association with Table 2). In this aspect, the user equipment supported reference signal bandwidth may further comprise a maximum reference signal bandwidth value supported by the UE (e.g., as described in association with Table 2). Block 702 may correspond to block 402 in process flow 400 and/or to stage 504 in signaling flow 500.

At block 704, the location server may determine a plurality of cells transmitting reference signals according to the user equipment supported reference signal bandwidth received at block 702 (e.g., as exemplified by Table 2 previously herein). In an aspect, at least one cell of the plurality of cells may comprise a cell set, where the cell set comprises one wide bandwidth cell and a least one narrow bandwidth cell, and where the wide bandwidth cell and the at least one narrow bandwidth cell share the same base station, the same carrier frequency and a common coverage area. Block 704 may correspond to block 404 in process flow 400 and/or to stage 506 in signaling flow 500.

At block 706, the location server may send, to the UE, positioning assistance data including reference signal configuration parameters for each cell of the plurality of cells determined at block 704, where the reference signal configuration parameters for each cell of the plurality of cells enable positioning measurements by the UE for one or more of the plurality of cells transmitting the reference signals. The positioning measurements may be measurements of RSTD in an aspect. Block 706 may correspond to block 406 in process flow 400 and/or to stage 508 in signaling flow 500.

In an aspect, the reference signal characteristics for block 702 may comprise at least one of a carrier bandwidth, a carrier frequency, a number of subframes per reference signal positioning occasion, a periodicity of reference signal positioning occasions, a muting, a type of reference signal, a carrier frequency hopping, or some combination of these.

In an aspect, the reference signal configuration parameters sent at block 706 for each cell of the plurality of cells may comprise parameters for at least one reference signal configuration for each cell of the plurality of cells, where the parameters for the at least one reference signal configuration for each cell of the plurality of cells comprise at least one of a carrier bandwidth, a carrier frequency, a carrier frequency offset, a number of subframes per positioning occasion, a starting point and periodicity of positioning occasions, a muting sequence, a code sequence, a frequency hopping sequence, a direction of transmission, or some combination of these. In this aspect, the at least one reference signal configuration for at least one cell of the plurality of cells may be a subset of a second reference signal configuration for the at least one cell of the plurality of cells (e.g., as described previously herein in association with FIG. 3B), where the subset is based on a subset of reference signal bandwidth or a subset of reference signal resource blocks for the second reference signal configuration, and where the subset of reference signal bandwidth or the subset of reference signal resource blocks is based on the user equipment supported reference signal bandwidth.

In an aspect, the plurality of cells transmitting reference signals determined at block 704 comprise cells that transmit reference signals corresponding to the reference signal characteristics. For example, the transmitted reference signals may correspond to one or more transmitted reference signal configurations that can each be supported (e.g., measured) by the user equipment based on the reference signal characteristics (e.g., as exemplified herein in association with FIGS. 3A and 3B).

In an aspect process flow 700 may include additional actions where the location server generates the positioning assistance data for block 706 based on the reference signal characteristics (e.g., as described for stages 506 and 508 of signaling flow 500). In this aspect, the location server may select at least one cell of the plurality of cells based on the at least one cell having a greatest number of reference signal configurations that can be measured by the user equipment, a greatest number of reference signal subframes within reference signal configurations that can be measured by the user equipment, a highest reference signal bandwidth that can be measured by the user equipment, a greatest number of consecutive reference signal subframes across all reference signal configurations that can be measured by the user equipment, or some combination of these.

In an aspect, the process flow 700 may further comprise other actions, wherein the location server sends a positioning request to the UE (e.g., as at stage 510 of signaling flow 500) and receives the positioning measurements from the UE in response (e.g., as at stage 514 of signaling flow 500). In a further aspect, the location server may then calculate a location of the UE based on the received positioning measurements (e.g., as at stage 516 of signaling flow 500). In an alternative further aspect, the location server may receive a location of the UE from the UE, where the UE calculates the location based on the positioning measurements.

Figure 8:
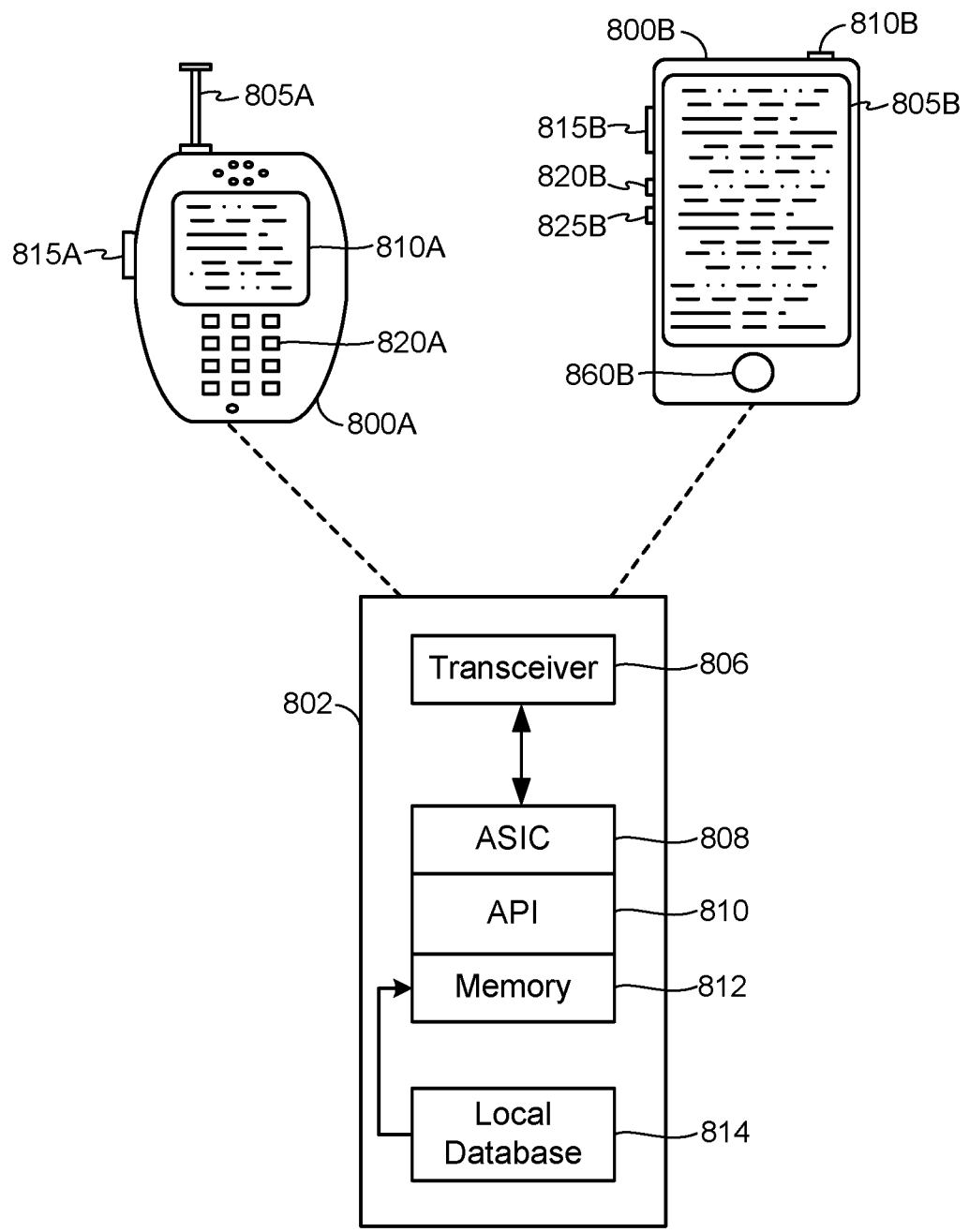
FIG. 8 illustrates examples of user equipments (UEs) in accordance with aspects of the disclosure.

FIG. 8 illustrates examples of UEs in accordance with aspects of the disclosure. Referring to FIG. 8, UE 800A is illustrated as a cellphone and UE 800B is illustrated as a touchscreen device (e.g., a smart phone, a tablet computer, etc.). UEs 800A and 800B may correspond to any of UEs 1 to N in communications system 100 and/or to any of UEs 250, 252, and/or 254 in FIGS. 2A and 2B. As shown in FIG. 8, an external casing of UE 800A is configured with an antenna 805A, display 810A, at least one button 815A (e.g., a Push-To-Talk (PTT) button, a power button, a volume control button, etc.) and a keypad 820A among other components, as is known in the art. Also, an external casing of UE 800B is configured with a touchscreen display 805B, peripheral buttons 810B, 815B, 820B and 825B (e.g., a power control button, a volume or vibrate control button, an airplane mode toggle button, etc.), at least one front-panel button 860B (e.g., a Home button, etc.), among other components, as is known in the art. While not shown explicitly as part of UE 800B, the UE 800B can include one or more external antennas and/or one or more internal antennas that are built into the external casing of UE 800B, including but not limited to WiFi antennas, cellular antennas, GNSS antennas (e.g., GPS antennas), and so on.

While internal components of UEs such as the UEs 800A and 800B can be embodied with different hardware configurations, a basic high-level UE configuration for internal hardware components is shown as platform 802 in FIG. 8. The platform 802 can receive and execute software applications, data and/or commands transmitted from the RAN 120 that may ultimately come from the core network 140, the Internet 175 and/or other remote servers and networks (e.g., location server 170, web URLs, etc.). The platform 802 can also independently execute locally stored applications without RAN interaction. The platform 802 can include a transceiver 806 operably coupled to an application specific integrated circuit (ASIC) 808, or other processor, microprocessor, logic circuit, or other data processing device. The ASIC 808 or other processor executes the application programming interface (API) 810 layer that interfaces with any resident programs in the memory 812 of the wireless device. The memory 812 can be comprised of read-only memory (ROM) or random-access memory (RAM), electrically erasable programmable ROM (EEPROM), flash cards, or any memory common to computer platforms. The platform 802 also can include a local database 814 that can store applications not actively used in memory 812, as well as other data. The local database 814 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 800A, 800B, etc.) including the ability to perform the functions described herein (e.g., as described for FIGS. 4, 5, and 6). As will be appreciated by those skilled in the art, the various logic elements can be embodied in discrete elements, software modules executed on a processor or any combination of software and hardware to achieve the functionality disclosed herein. For example, transceiver 806, ASIC 808, memory 812, API 810, and local database 814 may all be used cooperatively to load, store and execute the various functions disclosed herein and thus the logic to perform these functions may be distributed over various elements. Alternatively, the functionality could be incorporated into one discrete component. Therefore, the features of the UEs 800A and 800B in FIG. 8 are to be considered merely illustrative and the disclosure is not limited to the illustrated features or arrangement.

As a specific example, the transceiver 806 (e.g., a transmitter portion of the transceiver 806) may be configured to send (e.g., based on instructions and/or information from the ASIC 808) a message indicating reference signal characteristics supported by the UE (e.g., UE 800A, 800B) to a location server (e.g., location server 170), wherein the reference signal characteristics include a UE-supported reference signal bandwidth. The transceiver 806 (e.g., a receiver portion of the transceiver 806) may be further configured to receive, from the location server, positioning assistance data including reference signal configuration parameters for each cell of a plurality of cells transmitting reference signals according to the UE-supported reference signal bandwidth. The ASIC 808 may be configured (based on instructions and/or information stored in memory 812 and/or local database 814) to perform positioning measurements for one or more of the plurality of cells transmitting the reference signals based on the reference signal configuration parameters for each cell of the plurality of cells. As another specific example, the ASIC 808 may perform each of these operations based on instructions and/or information stored in memory 812 and/or local database 814 and/or received from transceiver 806.

The wireless communication between the UEs 800A and/or 800B and the RAN 120 can be based on different technologies, such as CDMA, WCDMA, time division multiple access (TDMA), frequency division multiple access (FDMA), Orthogonal Frequency Division Multiplexing (OFDM), GSM, LTE, NR (or 5G), or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of aspects of aspects of the disclosure.

Figure 9:
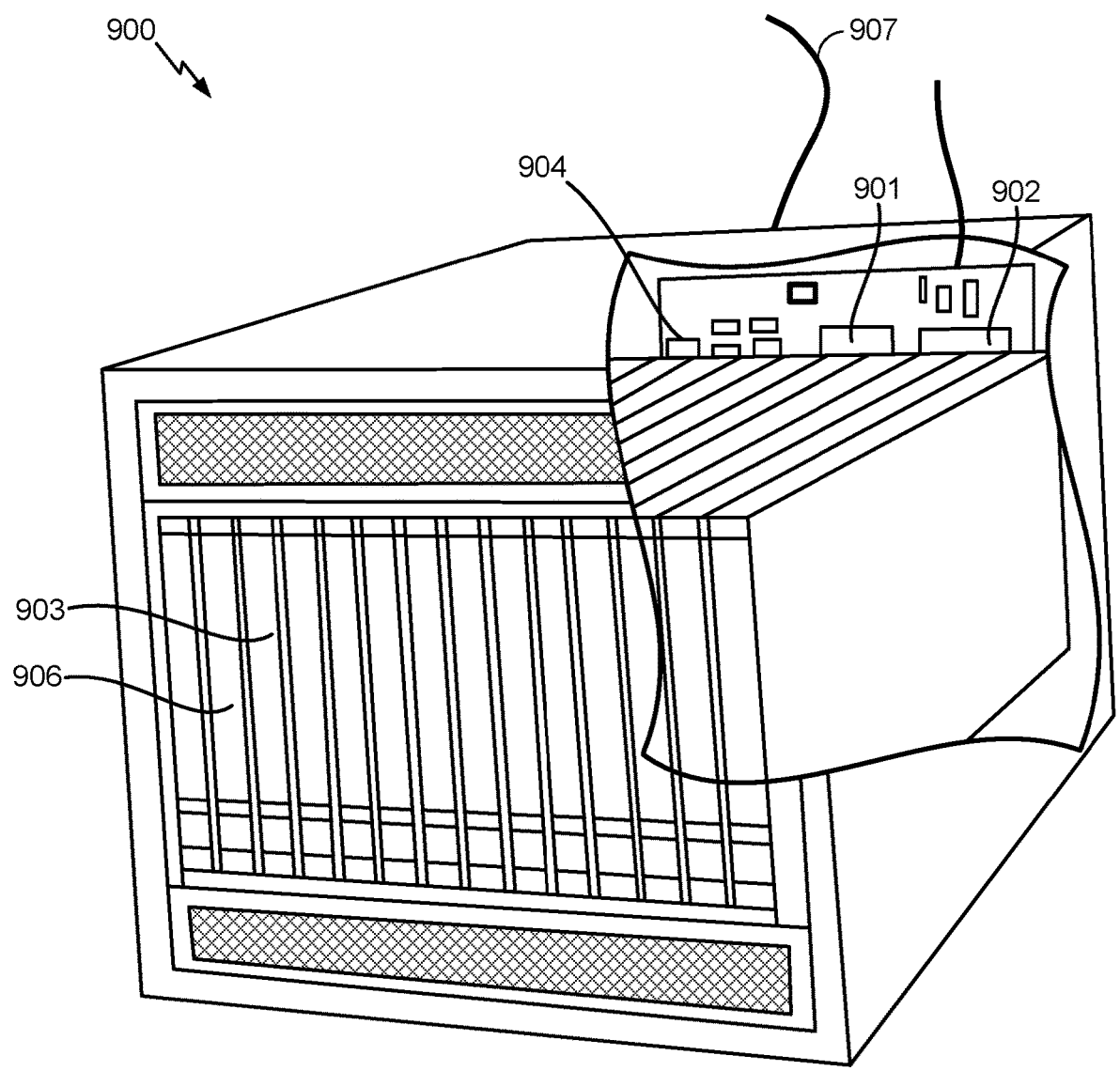
FIG. 9 illustrates a server in accordance with an aspect of the disclosure.

The various aspects described herein may be implemented on any of a variety of commercially available server devices, such as server 900 illustrated in FIG. 9. In an example, the server 900 may correspond to one example configuration of the location server 170 described above (e.g., may correspond to E-SMLC 172 or SLP 176). In FIG. 9, the server 900 includes a processor (or set of processors) 901 coupled to volatile memory 902 and a large capacity nonvolatile memory 903, such as a disk drive. The server 900 may also include a floppy disc drive, compact disc (CD) or digital versatile disc (DVD) drive 906 coupled to the processor 901. The server 900 may also include network access ports 904 coupled to the processor 901 for establishing data connections with a network 907, such as the Core Network 140, the Internet 175 or a local area network coupled to other broadcast system computers and servers.

Accordingly, an aspect of the disclosure can include a server (e.g., server 900, etc.) including the ability to perform the functions described herein (e.g., as described for FIGS. 4, 5, and 7). As will be appreciated by those skilled in the art, the various logic elements can be embodied in discrete elements, software modules executed on a processor or any combination of software and hardware to achieve the functionality disclosed herein. For example, processor 901, volatile memory 902, and nonvolatile memory 903 may all be used cooperatively to load, store and execute the various functions disclosed herein and thus the logic to perform these functions may be distributed over various elements. Alternatively, the functionality could be incorporated into one discrete component. Therefore, the features of the server 900 in FIG. 9 are to be considered merely illustrative and the disclosure is not limited to the illustrated features or arrangement.

As a specific example, the network access ports 904 may be configured to receive, from a UE (e.g., UE 800A, 800B), a message indicating reference signal characteristics supported by the UE, wherein the reference signal characteristics include a user equipment supported reference signal bandwidth. The processor 901 may be configured (based on instructions and/or information stored in volatile memory 902 and/or nonvolatile memory 903) to determine a plurality of cells transmitting reference signals according to the reference signal bandwidth. The network access ports 904 may be further configured (based on instructions and/or information from the processor 901) to send, to the UE, positioning assistance data including reference signal configuration parameters for each cell of the plurality of cells, wherein the reference signal configuration parameters for each cell of the plurality of cells enable positioning measurements by the UE for one or more of the plurality of cells transmitting the reference signals. As another specific example, the processor 901 may perform each of these operations based on instructions and/or information stored in volatile memory 902 and/or nonvolatile memory 903 and/or received from network access ports 904.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, DVD, floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for supporting multiple configurations of reference signals for Observed Time Difference of Arrival (OTDOA) positioning, comprising:
   sending, by a user equipment to a location server, a capabilities message identifying two or more reference signal bandiwth supported by the uer equipment to enable the location server to select a plurality of cells transmitting reference signals according to the two or more reference signal bandwidths supported by the user equipment, wherein the two or more reference signal bandwidths include at least one wide reference signal bandwidth and at least one narrow reference signal bandwidth;
   receiving, at the user equipment from the location server, positioning assistane data including reference signal configuration parameters for each cell of the selected plurality of cells transmitting reference signals according to the two or more reference signal bandwidths supported by the user equipment; and
   performing, by the user equipment, positioning mesurements for one or more of the selected plurality of cells transmitting the reference signals based on the reference signal configuration parameters for each cell of the one or more of the selected plurality of cells.

2. The method of claim 1, wherein the two or more reference signal bandwidths supported by the user equipment comprise at least one reference signal bandwidth value supported by the user equipment.

3. The method of claim 2, wherein the two or more reference signal bandwidths supported by the user equipment further comprise a maimum reference signal bandwidth value supported by the user equipment.

4. The method of claim 1, wherein at least one cell of the selected plurality of cells comprises a cell set, wherein the cell set comprises one wide bandwidth cell and at least one narrow bandwidth cell, wherein the one wide bandwidth cell and the at least one narrow bandwidth cell share a same base station, a same carrier frequency, and a common coverage area.

5. The method of claim 1, wherein the capabilities message further comprises at least one of a carrier bandwidth, a carrier frequency, a number of subframes per reference signal positioning occasion, a periodicity of reference signal positioning occasions, a muting sequence, a type of reference signal, a carrier frequency hopping, or any combination thereof.

6. The method of claim 1, wherein the reference signal configuration parameters for each cell of the selected plurality of cells comprise parameters for at least one reference signal configuarion for each cell of the selected plurality of cells, the parameters comprising at least one of a carrier bandwidth, a carrier frequency, a carrier frequency offset, a number of subframes per positioning occasion, a starting point and periodicity of positioning occasions, a muting sequence, a code sequence, a frequency hopping sequency, and a direction of transmission or any combination thereof.

7. The method of claim 6, wherein the at least one reference signal configuration for at least one cell of the plurality of cells is a subset of a second reference signal configuration for the at least one cell of the plurality of cells, wherein the subset is based on a subset of reference signal bandwidth or a subset of reference signal resource blocks for the second reference signal configuration, wherein the subset of reference signal bandwidth or the subset of reference signal resource blocks is based on the user equipment.

8. The method of claim 1, wherein the location server generates the positioning assistance data based on the two or more reference signal bandwidths supported by the user equipment.

9. The method of claim 8, wherein the location server selects at least one cell of the selected plurality of cells based on the at least one cell having a greatest number of reference signal configurations that can be measured by the user equipment, a greatest number of reference signal subframes within reference signal configurations that can be measured by the user euipment, a highest reference signal bandwidth that can be measured by the user equipment, a greatest number of consecutive reference signal subframes across all reference signal configurations that can be measured by the user equipment, or any combination thereof.

10. The method of claim 1, further comprising:
    receiving a positioning request from the location server; and
    sending the positioning measurements to the location server, wherein the location server calculates a location of the user equipment based on the positioning measurements.

11. The method of claim 1, further comprising:
    calculating, by the user equipment, a location of the user equipment based on the positioning measurements.

12. The method of claim 1, wherein the reference signals comprise Positioning Reference Signals (PRS) or Cell-specific Reference Signals (CRS) for Long-Term Evolution (LTE).

13. The method of claim 12, wherein the positioning measurements comprise reference signal time difference (RSTD) measurements.

14. The method of claim 1, wherein the at least one narrow bandwidth reference signal bandwidth comprises a bandwidth of less than or equal to 1.4 MHz and the at least one wide bandwidth reference signal bandwidth comprises a bandwidth of greater than or equal to 1.4 MHz.

15. A method for supporting multiple configurations of reference signals for Observed Time Difference of Arrival (OTDOA) positioning, comprising:
receiving, by a location server from a user equipment, a capabilities message identifying two or more reference signal bandwidths supported by the user equipment, wherein the two or more reference signal bandwidths include at least one wide reference signal bandwidth and at least one narrow reference signal bandwidth;
determining, by the location server, a plurality of cells transmitting reference signals according to the two or more reference signal bandwidths supported by the user equipment; and
sending, from the location server to the user equipment, positioning assistance data including reference signal configuration parameters for each cell of the plurality of cells, wherein the reference signal configuration parameters for each cell of the plurality of cells enable positioning measurements by the user equipment for one or more of the plurality of cells transmitting the reference signals.

16. The method of claim 15, wherein the two or more reference signal bandwidths supported by the user equipment comprise at least one reference signal bandwidth value supported by the user equipment.

17. The method of claim 16, wherein the two or more reference signal bandwidths supported by the user equipment further comprise a maximum reference signal bandwidth value supported by the user equipment.

18. The method of claim 15, wherein the plurality of cells comprises a cell set, wherein the cell set comprises one wide bandwidth cell and a least one narrow bandwidth cell, wherein the wide bandwidth cell and the at least one narrow bandwidth cell share the same base station, a same carrier frequency, and a common coverage area.

19. The method of claim 15, wherein the capabilities message further comprises at least one of a carrier bandwidth, a carrier frequency, a number of subframes per reference signal positioning occasion, a periodicity of reference signal positioning occasions, a muting, a type of reference signal, a carrier frequency hopping, or any combination thereof.

20. The method of claim 15, wherein the reference signal configuration parameters for each cell of the plurality of cells comprise parameters for at least one reference signal configuration for each cell of the plurality of cells, the parameters comprising at least one of a carrier bandwidth, a carrier frequency, a carrier frequency offset, a number of subframes per positioning occasion, a starting point and periodicity of positioning occasions, a muting sequence, a code sequence, a frequency hopping sequence, a direction of transmission, or any combination thereof.

21. The method of claim 20, wherein the at least one reference signal configuration for at least one cell of the plurality of cells is a subset of a second reference signal configuration for the at least one cell of the plurality of cells, wherein the subset is based on a subset of reference signal bandwidth or a subset of reference signal resource blocks for the second reference signal configuration, wherein the subset of reference signal bandwidth or the subset of reference signal resource blocks is based on the two or more reference signal bandwidths supported by the user equipment.

22. The method of claim 15, further comprising:
generating the positioning assistance data based on two or more reference signal bandwidths supported by the user equipment.

23. The method of claim 22, further comprising:
selecting at least one cell of the plurality of cells based on the at least one cell having a greatest number of reference signal configurations that can be measured by the user equipment, a greatest number of reference signal subframes within reference signal configurations that can be measured by the user equipment, a highest reference signal bandwidth that can be measured by the user equipment, a greatest number of consecutive reference signal subframes across all reference signal configurations that can be measured by the user equipment, or any combination thereof.

24. The method of claim 15, further comprising:
sending a positioning request to the user equipment;
receiving the positioning measurements from the user equipment; and
calculating a location of the user equipment based on the positioning measurements.

25. The method of claim 15, further comprising:
receiving a location of the user equipment from the user equipment, wherein the user equipment calculates the location based on the positioning measurements.

26. The method of claim 15, wherein the reference signals comprise Positioning Reference Signals (PRS) or Cell-specific Reference Signals (CRS) for Long-Term Evolution (LTE).

27. The method of claim 26, wherein the positioning measurements comprise reference signal time difference (RSTD) measurements.

28. An apparatus for supporting multiple configurations of reference signals for Observed Time Difference of Arrival (OTDOA) positioning, comprising:
a transmitter of a user equipment configured to send, to a location server, a capabilities message identifying two or more reference signal bandwidths supported by the user equipment to enable the location server to select a plurality of cells transmitting reference signals according to the two or more reference signal bandwidths supported by the user equipment, wherein the two or more reference signal bandwidths include at least one wide reference signal bandwidth and at least one narrow reference signal bandwidth;
a receiver of the user equipment configured to receive, from the location server, positioning assistance data including reference signal configuration parameters for each cell of the selected plurality of cells transmitting reference signals according to the two or more reference signal bandwidths supported by the user equipment; and
at least one processor of the user equipment configured to perform positioning measurements for one or more of the selected plurality of cells transmitting the reference signals based on the reference signal configuration parameters for each cell of the one or more of the selected plurality of cells.

29. An apparatus for supporting multiple configurations of reference signals for Observed Time Difference of Arrival (OTDOA) positioning, comprising:
a receiver of a location server configured to receive, from a user equipment, a capabilities message identifying two or more reference signal bandwidths supported by the user equipment, wherein the two or more reference signal bandwidths include at least one wide reference signal bandwidth and at least one narrow reference signal bandwidth;
at least one processor of the location server configured to determine a plurality of cells transmitting reference signals according to the two or mpre reference signal bandwidths supported by the user equipment; and
a transmitter of the location server configured to send, to the user equipment, positioning assistance data including reference signal configuration parameters for each of the plurality of cells, wherein the reference signal configuration parameters for each cell of the plurality of cells enable positioning measurements by the user equipment for one or more of the plurality of cells transmitting the reference signals.

* * * * *